US009204056B2

(12) United States Patent
Kaizu et al.

(10) Patent No.: US 9,204,056 B2
(45) Date of Patent: Dec. 1, 2015

(54) IMAGE PICKUP APPARATUS, IMAGE PICKUP APPARATUS CONTROL METHOD, AND PROGRAM

(75) Inventors: Shun Kaizu, Tokyo (JP); Tomoo Mitsunaga, Kanagawa (JP); Kensei Jo, Tokyo (JP); Teppei Kurita, Tokyo (JP)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 13/487,682

(22) Filed: Jun. 4, 2012

(65) Prior Publication Data

US 2012/0314124 A1    Dec. 13, 2012

(30) Foreign Application Priority Data

Jun. 13, 2011  (JP) ................................. 2011-131116

(51) Int. Cl.
H04N 5/235       (2006.01)
H04N 5/353       (2011.01)
H04N 5/355       (2011.01)

(52) U.S. Cl.
CPC .......... H04N 5/2353 (2013.01); H04N 5/2355 (2013.01); H04N 5/3532 (2013.01); H04N 5/3535 (2013.01); H04N 5/35581 (2013.01)

(58) Field of Classification Search
USPC ........................ 348/222.1, 294, 296, 362–368
See application file for complete search history.

(56) References Cited

U.S. PATENT DOCUMENTS

| | | | | |
|---|---|---|---|---|
| 6,665,010 B1 * | 12/2003 | Morris et al. | ................. | 348/297 |
| 7,986,446 B2 * | 7/2011 | Sorgius | ......................... | 358/474 |
| 8,488,033 B2 * | 7/2013 | Takane | ......................... | 348/296 |
| 2001/0035908 A1 * | 11/2001 | Kim | ............................. | 348/221 |
| 2002/0012065 A1 * | 1/2002 | Watanabe | .................... | 348/364 |
| 2002/0145674 A1 * | 10/2002 | Nakamura | .................... | 348/296 |
| 2003/0122939 A1 * | 7/2003 | Bell et al. | ................... | 348/229.1 |
| 2003/0210345 A1 * | 11/2003 | Nakamura et al. | ............ | 348/362 |
| 2005/0271379 A1 * | 12/2005 | Lee | ................ | 396/234 |
| 2006/0044459 A1 * | 3/2006 | Kato | ............................ | 348/362 |
| 2007/0103562 A1 * | 5/2007 | Kaneko et al. | ............ | 348/222.1 |
| 2007/0115372 A1 * | 5/2007 | Wu et al. | .................... | 348/230.1 |

(Continued)

FOREIGN PATENT DOCUMENTS

JP       2010-136205 A      6/2010

OTHER PUBLICATIONS

Gu., J., et al., "Coded Rolling Shutter Photography: Flexible Space-Time Sampling", IEEE International Conference on Computational Photography (ICCP), 2010, 8 pages.

(Continued)

*Primary Examiner* — Michael Osinski
(74) *Attorney, Agent, or Firm* — Sony Corporation

(57) ABSTRACT

There is provided an image pickup apparatus including: a control unit generating exposure time control data in which an exposure time of an image sensor is set in pixel region units; and an image sensor inputting the exposure time control data and carrying out image acquisition based on exposure time control in the pixel region units. The control unit successively and sequentially generates the exposure time control data in region units based on luminance information in the pixel region units that form part of a preceding picked-up image and outputs the exposure time control data to the image sensor. The image sensor inputs the exposure time control data in the region units from the control unit and successively and sequentially uses the inputted exposure time control data to carry out the image acquisition based on the exposure time control in the pixel region units.

9 Claims, 25 Drawing Sheets

(56) References Cited

U.S. PATENT DOCUMENTS

| | | | |
|---|---|---|---|
| 2007/0171298 A1* | 7/2007 | Kurane | 348/362 |
| 2007/0216777 A1* | 9/2007 | Quan et al. | 348/222.1 |
| 2008/0024616 A1* | 1/2008 | Takahashi | 348/221.1 |
| 2008/0084623 A1* | 4/2008 | Onuki | 359/841 |
| 2008/0253758 A1* | 10/2008 | Yap et al. | 396/234 |
| 2008/0284873 A1* | 11/2008 | Miyanari | 348/229.1 |
| 2009/0021621 A1* | 1/2009 | Hashimoto et al. | 348/300 |
| 2009/0073306 A1* | 3/2009 | Kwon et al. | 348/362 |
| 2009/0213247 A1* | 8/2009 | Tanaka et al. | 348/240.99 |
| 2010/0013955 A1* | 1/2010 | Nagasaki | 348/229.1 |
| 2010/0020198 A1* | 1/2010 | Okamoto | 348/231.99 |
| 2010/0157078 A1* | 6/2010 | Atanassov et al. | 348/222.1 |
| 2011/0001859 A1* | 1/2011 | Matsuura et al. | 348/296 |
| 2011/0063475 A1* | 3/2011 | Kashiwagi et al. | 348/229.1 |
| 2011/0090365 A1* | 4/2011 | Cha et al. | 348/229.1 |
| 2011/0141331 A1* | 6/2011 | Lee et al. | 348/297 |
| 2011/0149129 A1* | 6/2011 | Kim et al. | 348/296 |
| 2011/0254976 A1* | 10/2011 | Garten | 348/229.1 |
| 2012/0133793 A1* | 5/2012 | Inaba et al. | 348/229.1 |
| 2012/0257077 A1* | 10/2012 | Suzuki | 348/222.1 |
| 2012/0281133 A1* | 11/2012 | Kurita et al. | 348/362 |
| 2012/0300094 A1* | 11/2012 | Kaida | 348/222.1 |
| 2013/0093930 A1* | 4/2013 | Mihara et al. | 348/294 |
| 2013/0202206 A1* | 8/2013 | Yi et al. | 382/170 |

OTHER PUBLICATIONS

Shimizu, S., et al., "A New Algorithm for Exposure Control Based on Fuzzy Logic for Video Cameras", IEEE Transactions on Consumer Electronics, Aug. 1992, 617-623, vol. 38, No. 3.

* cited by examiner

FIG. 25
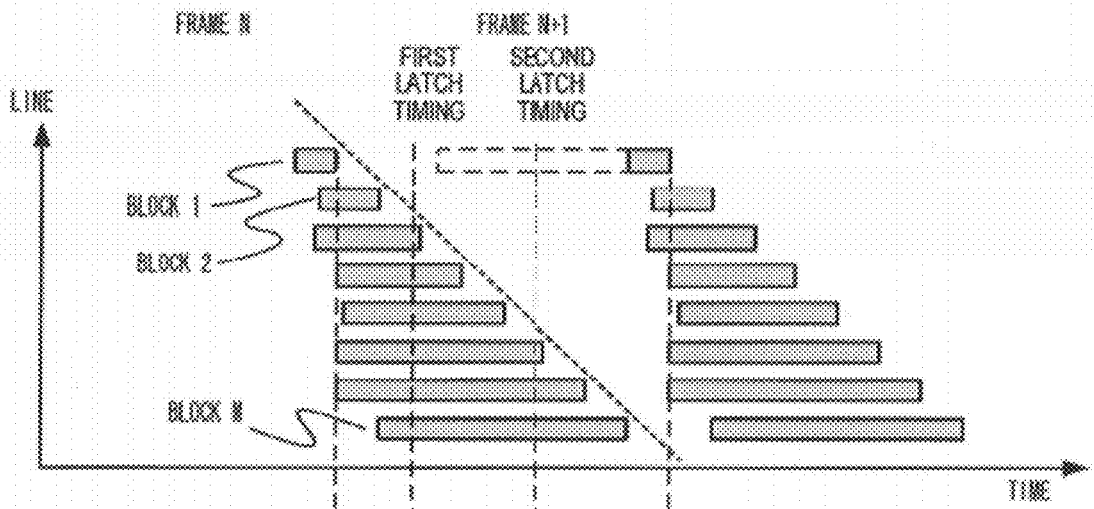
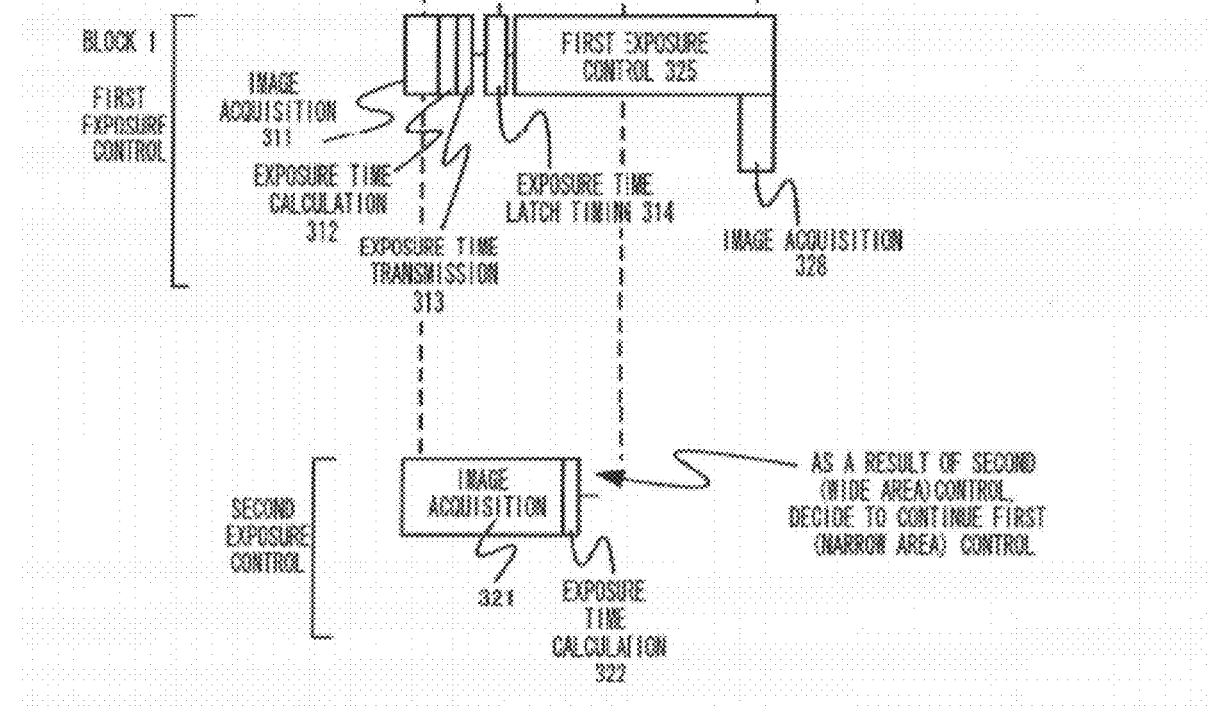

IMAGE PICKUP APPARATUS, IMAGE PICKUP APPARATUS CONTROL METHOD, AND PROGRAM

BACKGROUND

The present disclosure relates to an image pickup apparatus, an image pickup apparatus control method, and a program. In more detail, the present disclosure relates to an image pickup apparatus, an image pickup apparatus control method, and a program that carry out exposure control in region units.

An example of the configuration and image pickup process of a CMOS image sensor as one example of an image sensor is described below with reference to FIG. 1. FIG. 1 is a diagram showing the partial configuration of an image sensor (CMOS image sensor) 101. The image sensor (CMOS image sensor) 101 includes a vertical scan circuit 102, a horizontal scan circuit 103, and a plurality of pixels 104 disposed in an array.

When an exposure process is carried out to pick up an image of a subject, charge accumulates in a photodiode inside each of the pixels 104. The charge accumulated in the photodiode in each pixel is outputted via an amp transistor and a transfer transistor to a vertical signal wire 113. The signal current outputted to the vertical signal wire 113 is also supplied to the horizontal scan circuit 103 and, after being subjected to specified signal processing, is outputted via a signal output wire 114 to the periphery.

Since each vertical signal wire 113 is commonly connected to pixels that are aligned in the vertical direction, to read out the signals of the individual pixels, it is necessary to output the signal of only one pixel at a time to the vertical signal wire 113.

With the image sensor (CMOS image sensor) 101, signals can be read out separately from the individual pixels for example by first reading out signals from the respective pixels 104d aligned on the bottom line as shown in FIG. 2A, then reading out signals from a line of pixels 104c as shown in FIG. 2B, and after that reading out signals while successively changing the line being read out. As one example, the control signals for such pixel reads are outputted from horizontal reset wires 111 and horizontal select wires 112 connected to the vertical scan circuit 102 shown in FIG. 1.

Immediately after a read process for the accumulated charge, the individual pixels 104 that construct the image sensor (CMOS image sensor) 101 again start to be exposed. That is, the exposure process for the next image frame starts.

In this way, when the read out process is carried out successively in line units and the exposure process starts immediately afterwards, the exposure start time and end time will differ, that is, a difference in exposure time (or "exposure period") will be produced, between the photodiodes 104a on the first line and the photodiodes 104d on the last line. This is a characteristic phenomenon of a shutter operation referred to as a "focal plane shutter" or a "rolling shutter". Note that although only the four lines 104a to 104d are shown in the drawings, this is because only part of an image sensor is illustrated and an actual image sensor will have many more lines, such as several hundred to several thousand lines, with signals being successively read out in line units.

Existing image sensors typically use a configuration where the exposure time, that is, the time from the start to the end of exposure is the same for every pixel.

However, in recent years, a configuration where the exposure time is controlled for individual pixels on an image sensor in accordance with the brightness of the subject has been proposed. By carrying out such exposure control, it is possible to increase the dynamic range of the picked-up images.

A process that expands the dynamic range through control over exposure time (hereinafter referred to as "shutter control") will now be described. If the exposure time is increased in a bright subject region, pixels become saturated with the accumulated charge, which stops accurate pixel values from being obtained. Meanwhile, if the exposure time is increased in a dark subject region, it becomes easier to obtain accurate pixel values that correspond to the luminance of the subject.

For this reason, in regions where the subject is bright, pixel values of pixels where the exposure time is reduced are acquired as effective pixel values. Meanwhile, in regions where the subject is dark, pixel values of pixels where the exposure time is increased are acquired as effective pixels. One method of expanding the dynamic range is to generate an output image by combining regions with reduced and increased exposure times. Note that when outputting the final pixel values, a pixel value adjusting process is carried out based on the respective exposure times.

In Japanese Laid-Open Patent Publication No. 2010-136205 and Jenwei Gu et al., "Coded Rolling Shutter Photography: Flexible Space-Time Sampling", Computational Photography (ICCP), 2010, a technique for expanding the dynamic range of picked-up images by setting different exposure times for each line of pixels on an image sensor is disclosed. One example is a configuration that sets a short exposure line and a long exposure line alternately for the lines of pixels on an image sensor For example, Publication No. 2010-136205 and the Jenwei Gu et al. article disclose a method of carrying out exposure time control in line units to set the exposure time in line units in keeping with the brightness of pixels on a screen. The configuration in the Publication No. 2010-136205 and the Jenwei Gu et al. article carries out exposure time control in units of image regions with a configuration that uses an electronic shutter.

An algorithm that adaptively sets the exposure time in keeping with the luminance of the subject has been described for example in Shuji Shimizu, et al., "A New Algorithm for Exposure Control Based on Fuzzy Logic for Video Cameras", IEEE Transactions on Consumer Electronics, Vol. 38-3, (1992). In this way, configurations for controlling the exposure time in units of regions, such as lines, in keeping with the brightness of a subject have already been disclosed. However, to carry out exposure control in keeping with subject luminance, it is necessary to decide the exposure time in pixel units before the start of image pickup. Here, there is a problem in that a delay is produced between the following two processes.

Process 1: a process of acquiring a preceding image to be used in a process that decides the exposure time in pixel units, and Process 2: subsequent to Process 1, an image pickup process that carries out exposure control that reflects the information produced by Process 1.

The longer the delay mentioned above, the greater the difficulty in tracking changes in brightness. As a result, there is the problem that images that are too bright or too dark will be acquired for some time after a change in brightness. In particular, if exposure control is carried out for respective regions such as line units or pixel units, compared to when exposure control is carried out over the entire screen as in the past, it becomes necessary to carry out more severe exposure control. When a single exposure time is decided for the entire screen as in the past, local movement of objects cause very little change in brightness. However, when exposure control is carried out on a region-by-region basis, it is necessary to track such local movement of objects, with the delay in such tracking having a larger effect than before.

The delay in reflecting movement in exposure control will now be described with reference to FIGS. 3 and 4. In FIGS. 3 and 4, time is shown on the horizontal axis and lines of pixels are shown on the vertical axis. As one example, in FIG. 3, the charge read timing shifts in line units as shown by the dotted lines 151a, 151b in the drawing.

The plurality of rectangular blocks shown in FIG. 3 show the exposure time of a single picked-up image frame, and represent the exposure time of line block units that are each composed of a line or a plurality of lines. The exposure process starts immediately after the timing shown by the read line 151a for the preceding picked-up image frame. As shown by the read line 151a, the exposure start time gradually shifts in line units. As shown by the graph in FIG. 3, exposure begins earlier for upper lines but only begins after an increasing delay for lines toward the bottom. For the line at the very top, the time (t1), is the exposure start time, while for the line at the very bottom, the time (t2) is the exposure start time.

The right ends of the plurality of rectangular blocks shown in FIG. 3 are the timing at which a read out process is carried out for the exposed image, with the accumulated charge of the pixels on each line being read at the timing shown by the read line 151b. In this example, since the exposure end time is approximately equal to the read out process time, as shown by the read line 151b in FIG. 3, the read out process is successively carried out for the pixels on each line starting from the first line.

For the line at the very top, the time (t2) is the exposure end time, while for the line at the very bottom, the time (t3) is the exposure end time. Note that in this example, since the exposure start and exposure end of the respective lines shift by the same amount in line units, the exposure time for every line is the same.

In FIG. 4, the exposure process and read out timing corresponding to three consecutive image pickup frames (numbered N to N+2) during image pickup of video images is shown. After read out of the final line in frame N ends, read out of the first line in frame N+1 begins. Acquisition of the entire image of frame N becomes possible at the read out timing of the final line. However, since the exposure of frame N+1 will have already started at such time, it is not possible for exposure control of frame N+1 to reflect the image acquired for frame N, and such control only becomes possible for frame N+2 onwards (i.e., a delay of two frames).

However, since the interval from the read out of the final line in frame N to the start of exposure of the first line in frame N+2 is short, if the calculation of exposure time and communication of control data take some time, it may not be possible to reflect frame N in the exposure control of frame N+2, resulting in an even longer delay.

In this way, if exposure control is carried out in accordance with the brightness of a subject, a delay is produced between the following two processes.

Process 1: a process of acquiring a preceding image to be used in a process that decides the exposure time in pixel units, and Process 2: subsequent to Process 1, an image pickup process that carries out exposure control that reflects the information produced by Process 1.

Due to such delay, there is the problem that optimal exposure control may not be possible.

SUMMARY

The present disclosure aims to provide an image pickup apparatus, an image pickup apparatus control method, and a program capable of exposure time control with little delay.

According to an embodiment of the present disclosure, there is provided an image pickup apparatus which includes a control unit generating exposure time control data in which an exposure time of an image sensor is set in pixel region units, and an image sensor inputting the exposure time control data and carrying out image acquisition based on exposure time control in the pixel region units. The control unit successively and sequentially generates the exposure time control data in region units based on luminance information in the pixel region units that form part of a preceding picked-up image and outputs the exposure time control data to the image sensor. The image sensor inputs the exposure time control data in the region units from the control unit and successively and sequentially uses the inputted exposure time control data to carry out the image acquisition based on the exposure time control in the pixel region units.

In an embodiment of the image pickup apparatus according to the present disclosure, the control unit successively and sequentially generates the exposure time control data in the region units based on luminance information in units of at least one line of the preceding picked-up image and outputs the exposure time control data to the image sensor, and the image sensor inputs the exposure time control data in region units from the control unit and successively and sequentially uses the inputted exposure time control data to carry out the image acquisition based on the exposure time control in units of at least one line.

In an embodiment of the image pickup apparatus according to the present disclosure, the control unit generates the exposure time control data by calculation that refers to only one block as a pixel region that is a unit for acquiring luminance information of the preceding picked-up image, and outputs the exposure time control data to the image sensor, and the image sensor carries out the image acquisition based on the exposure time control that uses the exposure time control data.

In an embodiment of the image pickup apparatus according to the present disclosure, the control unit generates first exposure time control data calculated by referring to only one block as a pixel region that is a unit for acquiring luminance information of the preceding picked-up image and second exposure time control data calculated by referring to a plurality of blocks and outputs the first exposure time control data and the second exposure time control data to the image sensor, and the image sensor carries out the image acquisition based on the exposure time control that selectively uses one of the first exposure time control data and the second exposure time control data.

In an embodiment of the image pickup apparatus according to the present disclosure, the image sensor is operable, when carrying out the image acquisition selectively using the first exposure time control data and the second exposure time control data, to carry out a reset process of accumulated pixel charge to set a selectively used exposure time.

In an embodiment of the image pickup apparatus according to the present disclosure, the control unit successively and sequentially generates the exposure time control data in the region units based on luminance information in pixel region units that form part of an image frame N that is the preceding picked-up image and outputs the exposure time control data to the image sensor, and the image sensor inputs the exposure time control data in the region units from the control unit and successively and sequentially uses the inputted exposure time control data to carry out exposure time control in the pixel region units of an image frame N+1 that is a consecutively picked-up image following the image frame N.

In an embodiment of the image pickup apparatus according to the present disclosure, the image pickup apparatus further includes a high dynamic range processing unit generating a high dynamic range image based on pixel information of long exposure pixels and short exposure pixels.

According to an embodiment of the present disclosure, there is provided an image pickup apparatus control method executed by an image pickup apparatus which includes generating, by way of a control unit, exposure time control data in which an exposure time of an image sensor is set in pixel region units, and inputting, by way of an image sensor, the exposure time control data and carrying out image acquisition based on exposure time control in the pixel region units. In the step of generating, the exposure time control data is successively and sequentially generated in region units based on luminance information in the pixel region units that form part of a preceding picked-up image and the exposure time control data is outputted to the image sensor, and in the step of inputting, the exposure time control data in the region units is inputted from the control unit and the inputted exposure time control data is successively and sequentially used to carry out the image acquisition based on the exposure time control in the pixel region units.

According to an embodiment of the present disclosure, there is provided a program causing an image pickup apparatus to carry out an image pickup control process which includes generating, by way of a control unit, exposure time control data in which an exposure time of an image sensor is set in pixel region units, and inputting, by way of an image sensor, the exposure time control data and carrying out image acquisition based on exposure time control in the pixel region units. In the step of generating, the exposure time control data is successively and sequentially generated in region units based on luminance information in the pixel region units that form part of a preceding picked-up image and the exposure time control data is outputted to the image sensor, and in the step of inputting, the exposure time control data in the region units is inputted from the control unit and the inputted exposure time control data is successively and sequentially used to carry out the image acquisition based on the exposure time control in the pixel region units.

Note that the program according to the present disclosure is a program provided, via a storage medium for example, to an information processing apparatus or a computer system capable of executing various program code. By having the program executed by a program executing unit in such information processing apparatus or computer system, processing according to the program is realized.

Other objects, features, and advantages of the technology according to the present disclosure should be apparent from the following detailed description of the embodiments and the appended drawings. Note that the expression "system" in this specification refers to a logical grouping of a plurality of apparatuses and is not limited to having the various apparatuses present inside a single housing.

According to the embodiments of the present disclosure described above, an exposure time control process with a reduced delay is realized in a configuration that controls exposure time in pixel region units of an image. More specifically, a control unit generating exposure time control data in which an exposure time of an image sensor is set in pixel region units and an image sensor inputting the exposure time control data and carrying out image acquisition based on exposure time control in the pixel region units are included. The control unit successively and sequentially generates the exposure time control data in region units based on luminance information in the pixel region units that form part of a preceding picked-up image and outputs the exposure time control data to the image sensor. The image sensor inputs the exposure time control data in the region units from the control unit and successively and sequentially uses the inputted exposure time control data to carry out the image acquisition based on the exposure time control in the pixel region units. By carrying out a process that successively uses the exposure time control data in region units, an exposure time control process with a reduced delay is realized.

BRIEF DESCRIPTION OF THE DRAWINGS

FIGS. 25A and 25B are diagrams useful in explaining an example of an exposure time control sequence of an image pickup apparatus according to an embodiment of the present disclosure.

DETAILED DESCRIPTION OF THE EMBODIMENT(S)

Figure 1:
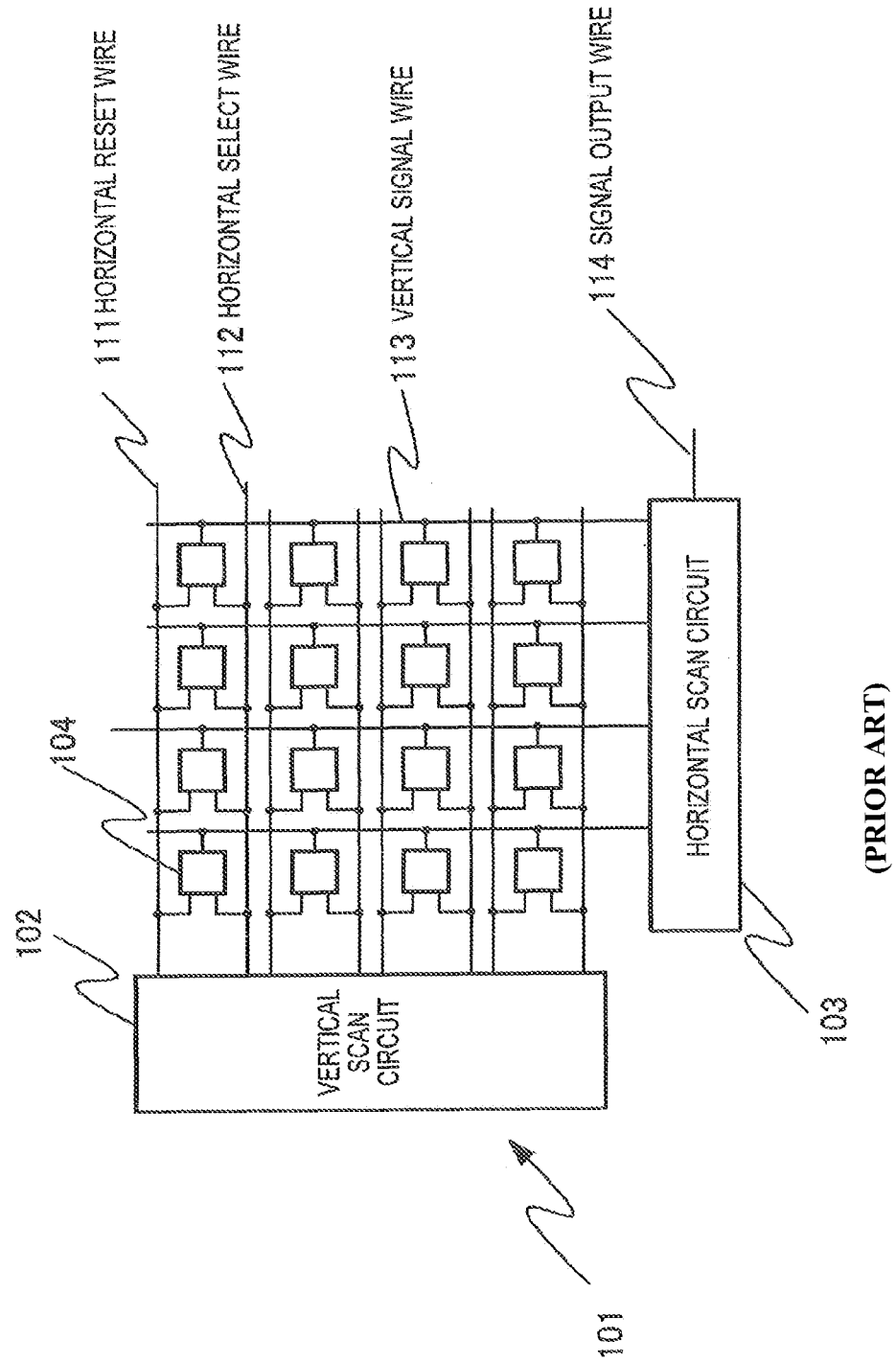
FIG. 1 is a diagram useful in explaining the configuration and image pickup process of an image sensor.
Figure 2:
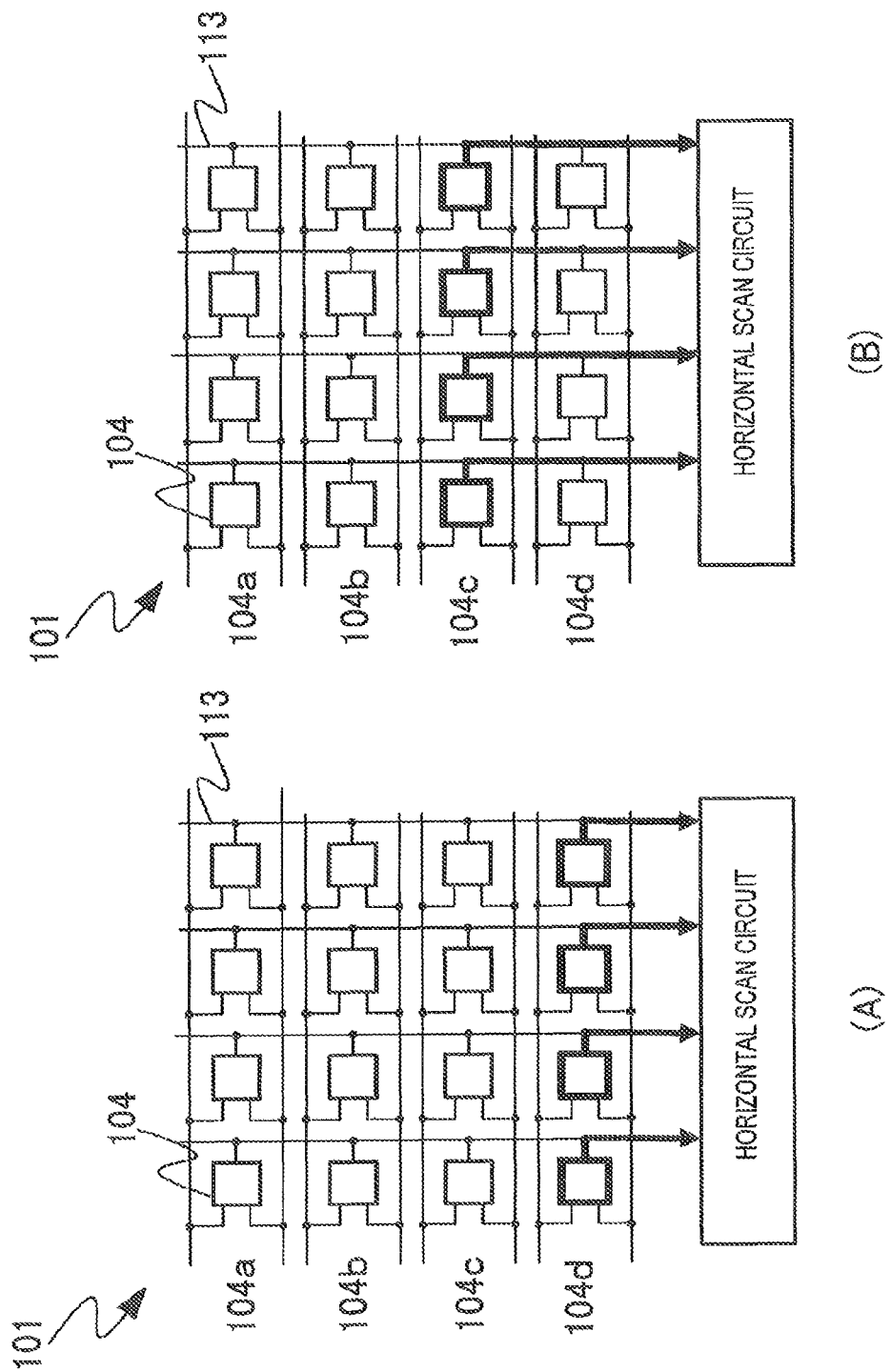
FIGS. 2A and 2B are diagrams useful in explaining the configuration and image pickup process of the image sensor.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

An image pickup apparatus, an image pickup apparatus control method, and a program according to the present disclosure will now be described in detail with reference to the drawings. The description is given in the order indicated below.

Figure 5:
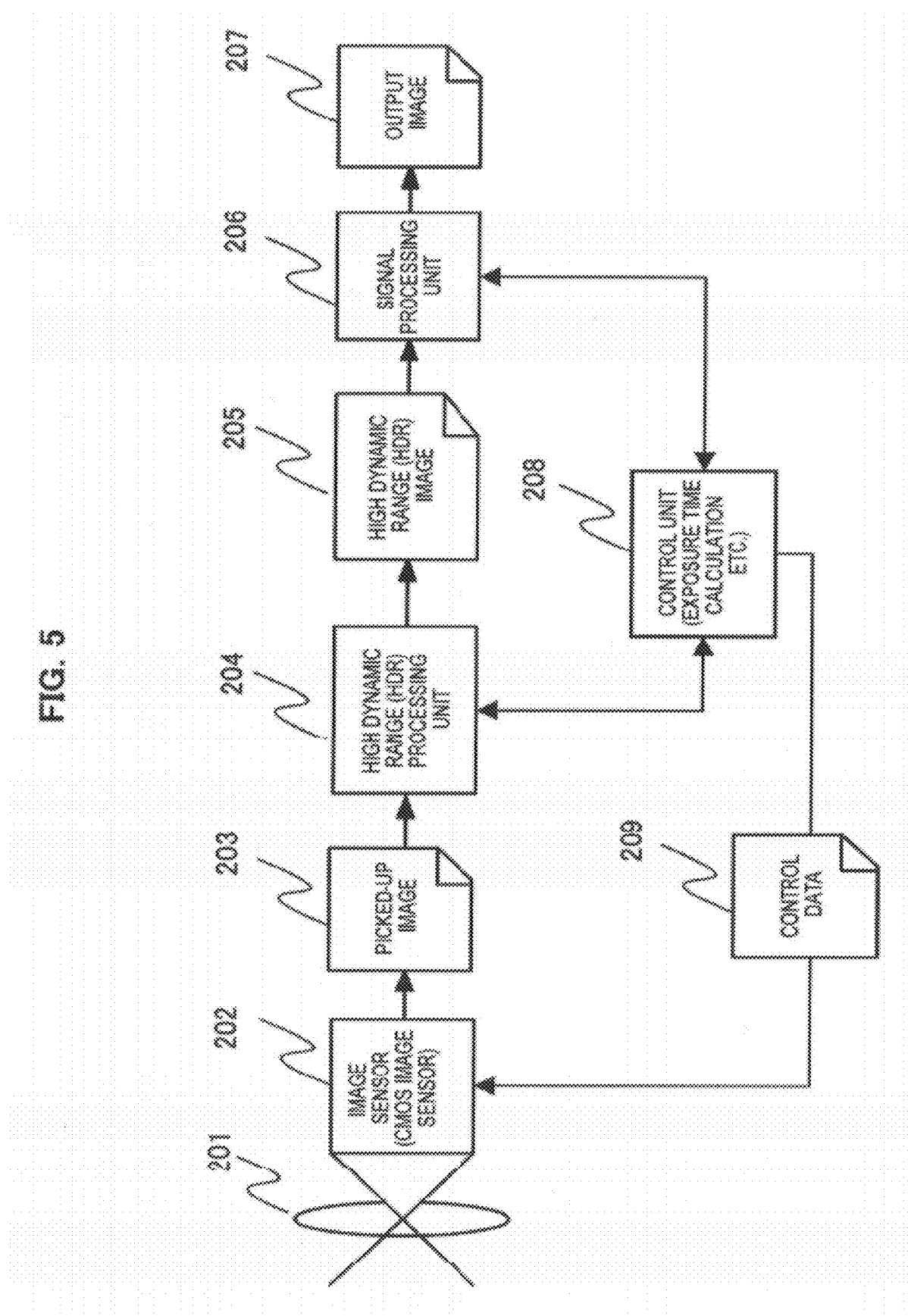
FIG. 5 is a diagram useful in explaining the configuration and processing of an image pickup apparatus.

1. Configuration and Processing of Image Pickup Apparatus
2. Exposure Time Control Process in Region Units
3. Example Operation of Image sensor according to Exposure Control in Region Units
4. Comparison of Exposure Control Process According to an Embodiment of the Present Disclosure and Existing Exposure Control Process
5. Modifications
6. Configuration of Exposure Control Based on Process Referring to a Plurality of Blocks
7. Conclusion 1. Configuration and Processing of Image Pickup Apparatus First, an example configuration of an image pickup apparatus will be described with reference to FIG. 5. As shown in FIG. 5, the image pickup apparatus includes an optical lens 201, an image sensor 202 constructed of a CMOS image sensor or the like, a high dynamic range (HDR) processing unit 204, a signal processing unit 206, and a control unit 208. The image pickup apparatus shown in FIG. 5 is configured to carry out high dynamic range (HDR) image pickup by picking up an image while changing the exposure time on a region-by-region basis.

The image pickup apparatus is an image pickup apparatus that is capable of picking up video and/or still images and realizes exposure time control in region units according to the luminance of the subject. When picking up video images, for example, luminance information is acquired in region units for a preceding image frame and exposure time control is carried out for the next picked-up frame in region units based on measured luminance information for such region units. When picking up still images, luminance information in region units is acquired using an image picked up immediately before the present image to be picked up and when picking up the present still image, exposure time control in region units is carried out based on measured luminance information for such region units.

Light that is incident via the optical lens 201 is subjected to photoelectric conversion by the image sensor 202 to obtain a picked-up image 203. In the HDR processing unit 204, the difference in sensitivity due to differences in exposure time in pixel region units is corrected to obtain an HDR image 205.

Note that the exposure time control specifically sets a short exposure time for bright subject regions and a long exposure time for dark subject regions. As a result, pixel values of the respective pixels of the picked-up image 203 are pixel values in keeping with the different exposure times. In the HDR processing unit 204, by referring to the exposure times of the respective pixels, pixel values for a case where all of the pixels have the same exposure time are calculated and an HDR image 205 in which such calculated pixel values are set is generated. The signal processing unit 206 carries out processing that improves image quality and thereby obtains an output image 207.

The control unit 208 carries out control over the various processes of the image pickup apparatus. For example, an optimal exposure time is calculated in pixel region units based on luminance information of a previously-acquired image and is outputted to the image sensor 202 as control data 209. The image sensor 202 carries out an image pickup process (charge accumulation) based on such control data 209 according to exposure time control in region units using an electronic shutter. Note that the control unit 208 carries out overall control of the various component elements in accordance with a program stored for example in a memory, not shown.

Figure 6:
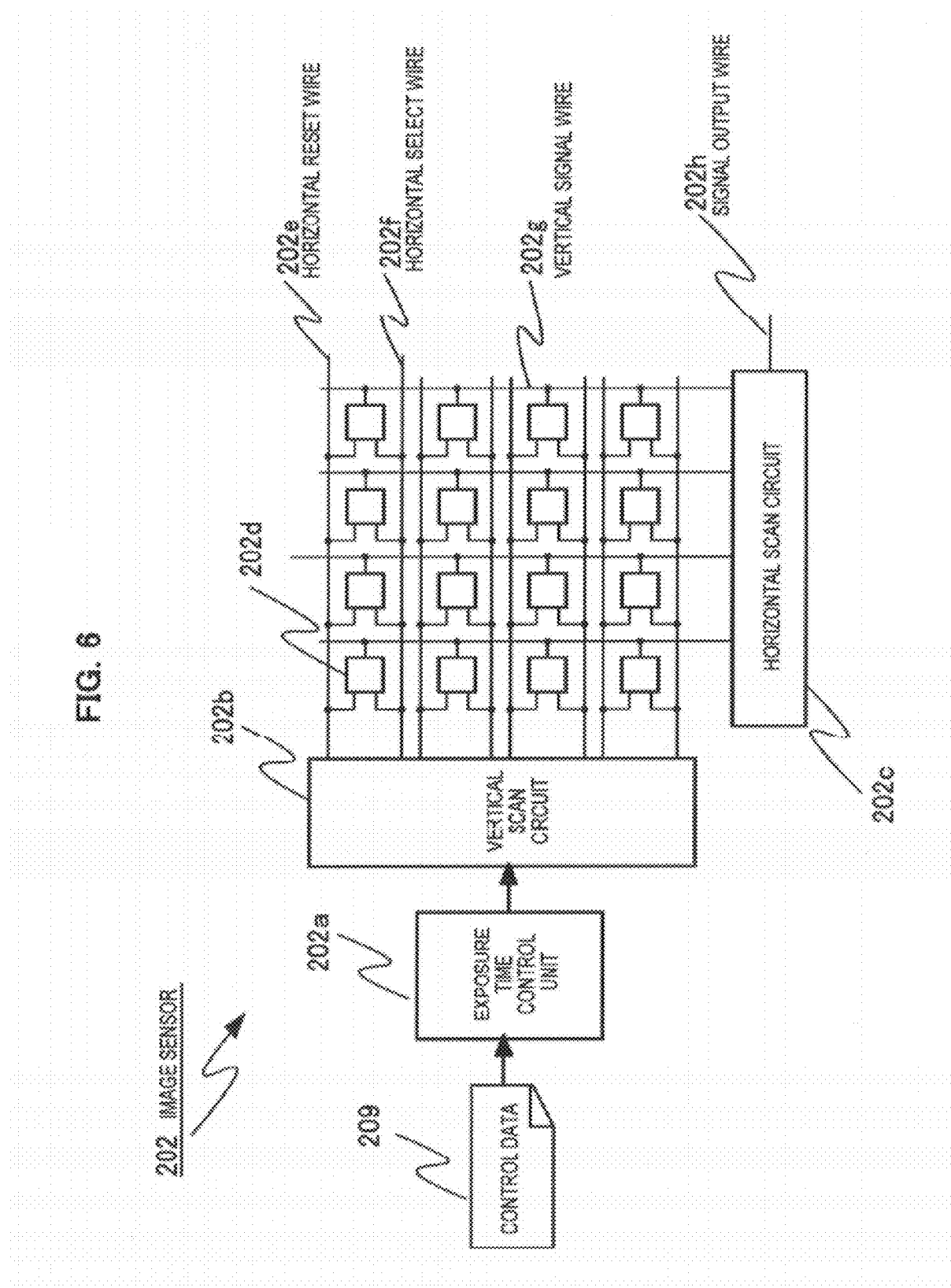
FIG. 6 is a diagram useful in explaining the configuration and image pickup processing of an image sensor.

The image sensor 202 is constructed of a CMOS image sensor, for example, and is an image sensor capable of exposure control in units of specified pixel regions. One specific example configuration is shown in FIG. 6. FIG. 6 is a diagram showing the configuration of part of the image sensor (CMOS image sensor) 202. As shown in FIG. 6, the image sensor (CMOS image sensor) 202 is constructed of an exposure time control unit 202a into which the control data 209 outputted from the control unit 208 is inputted, a vertical scan circuit 202b, a horizontal scan circuit 202c, and a plurality of pixels 202d disposed in an array.

Due to an exposure process carried out for image pickup of a subject, charge accumulates in a photodiode in each pixel 202d. The charge accumulated in the photodiode in each pixel is outputted via an amp transistor and a transfer transistor to a vertical signal wire 202g. The signal current outputted to the vertical signal wire 202g is also supplied to the horizontal scan circuit 202c and, after being subjected to specified signal processing, is outputted via a signal output wire 202h to the periphery.

Figure 7:
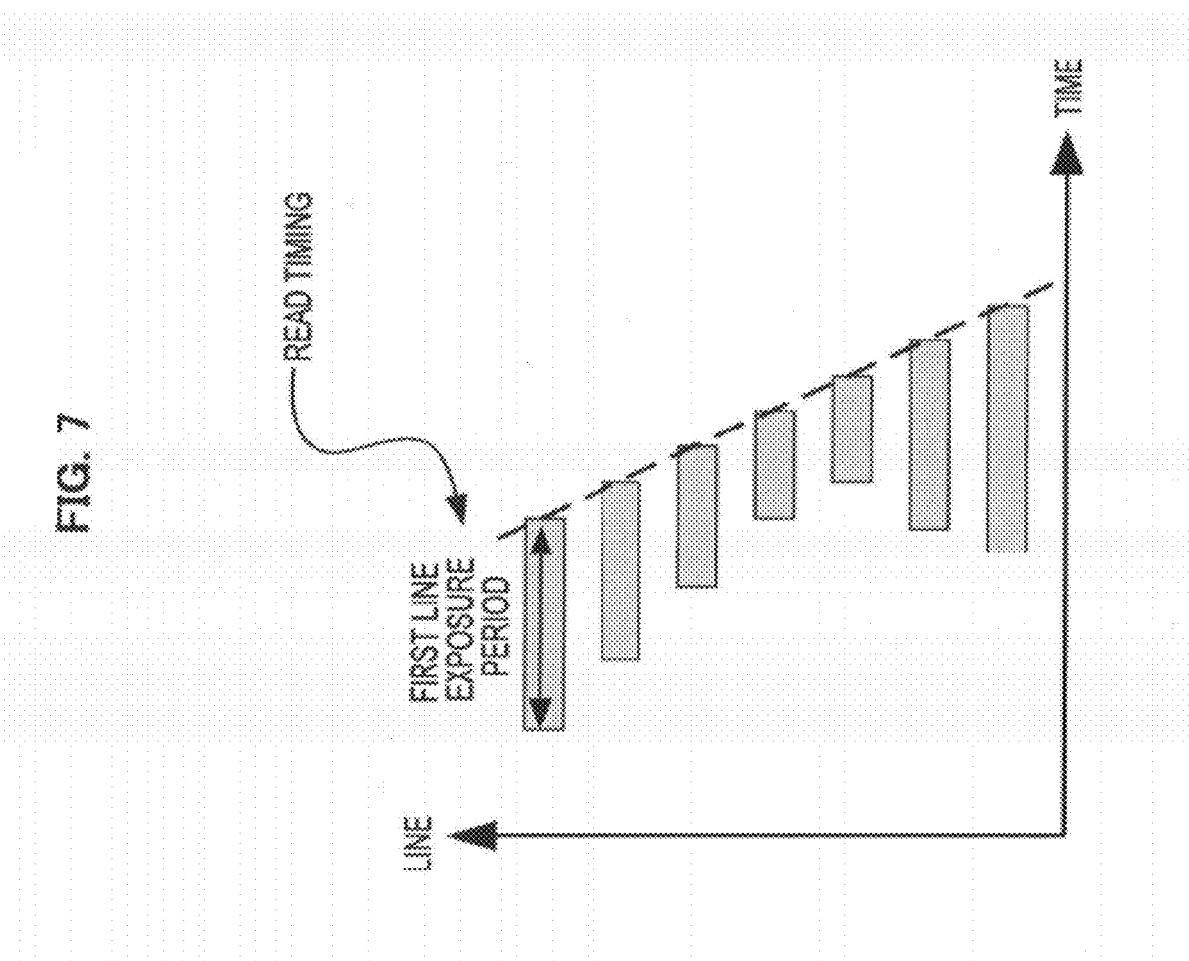
FIG. 7 is a diagram useful in explaining an image pickup processing sequence.
Figure 8:
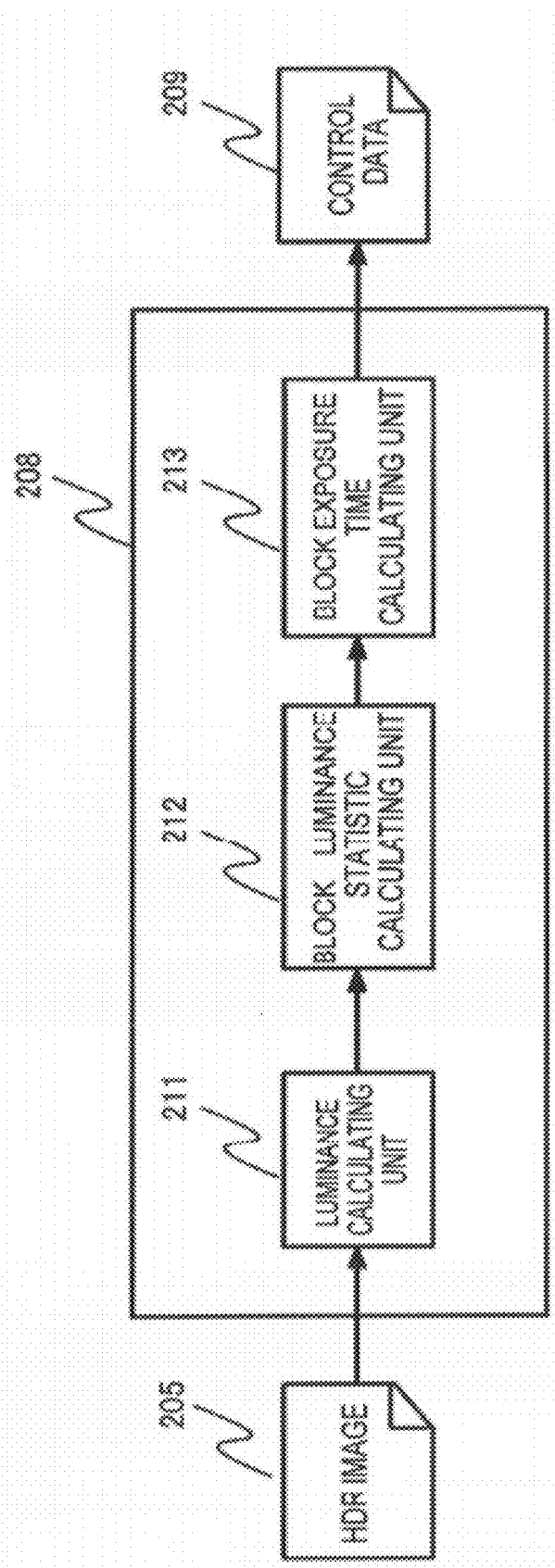
FIG. 8 is a diagram useful in explaining the configuration of an exposure time calculating process of a control unit.

As shown in FIG. 7, for example, the image sensor 202 is a CMOS image sensor where the exposure time can be controlled arbitrarily in line units. The configuration of such image sensor 202 is described for example in the Jenwei Gu et al. article mentioned earlier.

As described earlier, the HDR processing unit 204 corrects differences in sensitivity due to differences in the exposure time in pixel region units to obtain the HDR image 205. More specifically, by multiplying the respective pixel values of the picked-up image 203 by the reciprocal of the exposure time in each region, an image with linear luminance characteristics is generated and set as the HDR image 205.

In the image pickup apparatus shown in FIG. 5, the control unit 208 successively and sequentially generates exposure time control data (i.e., the control data 209) in region units based on luminance information in units of pixel regions that form part of a preceding picked-up image and outputs such exposure time control data to the image sensor 202. The image sensor 202 inputs the exposure time control data in region units from the control unit 208 and successively and sequentially uses the inputted exposure time control data to carry out image acquisition based on exposure time control in pixel region units.

2. Exposure Time Control Process in Region Units

Next, an exposure time control process in region units in keeping with subject luminance carried out by the control unit 208 will be described with reference to FIGS. 8 to 10C. FIG.

8 is a diagram showing an example configuration for carrying out the exposure time control process executed by the control unit 208. A luminance calculating unit 211 inputs the HDR image 205 generated by the HDR processing unit 204 based on the preceding picked-up image and calculates the luminance in pixel region units from the input image.

Figure 9:
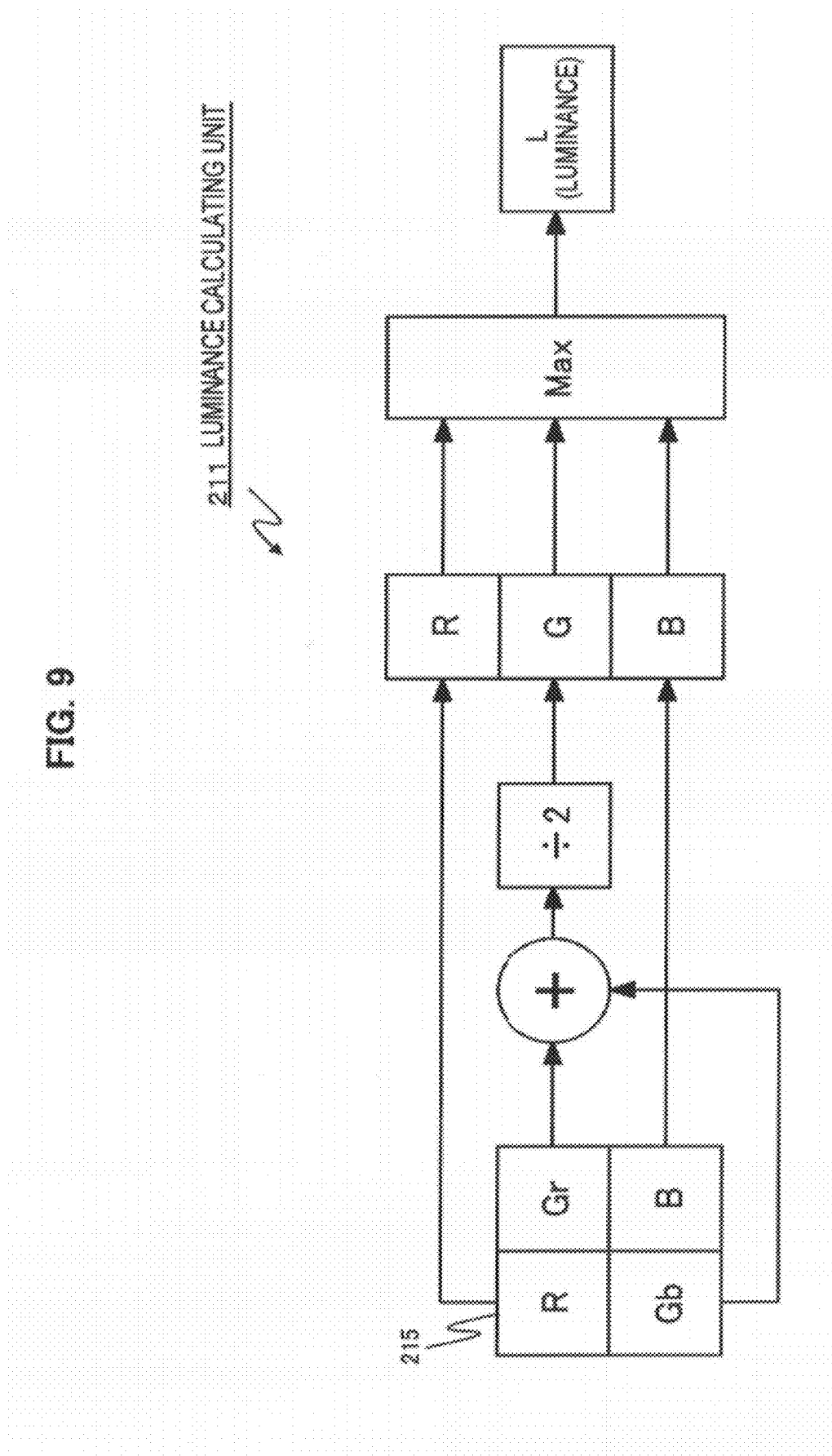
FIG. 9 is a diagram useful in explaining the configuration of an exposure time calculating process of a control unit.
Figure 10:
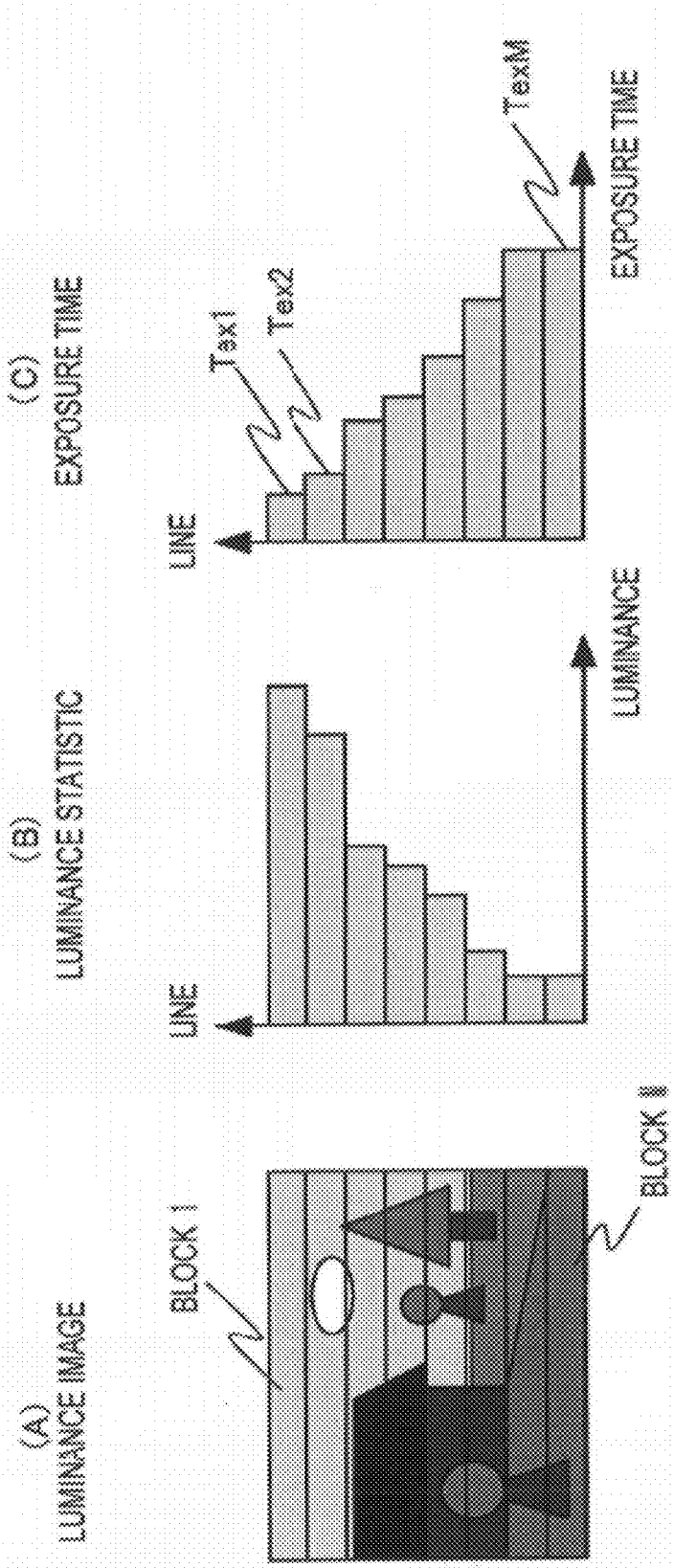
FIGS. 10A to 10C are diagrams useful in explaining an example of an exposure time setting process carried out by analyzing luminance.

As one example, as shown in FIG. 9, a 2×2 pixel region that constructs the HDR image 205 is set as a pixel region unit 215 for luminance calculation. A maximum value (MAX) of R, G, and B (where R is the pixel value of the R (red) pixel, G is an average value (Gr+Gb)/2 of the G (green) pixels, and B is the pixel value of the B (blue) pixel) is found, and is set as the luminance L of the pixel region unit 215 for luminance calculation.

A block luminance statistic calculating unit 212 calculates a luminance statistic such as that shown in FIG. 10B for each block composed of a plurality of lines as shown in FIG. 10A. In FIG. 10B the vertical axis shows lines and the horizontal axis shows a statistic that represents the brightness of each line block.

A block exposure time calculating unit 213 calculates an exposure time (Tex1 to TexM) to be set for each line block in FIG. 10C based on the luminance statistic of each block. By setting a short exposure time in bright regions, saturation of pixel values is suppressed. By setting a long exposure time in dark regions, control that improves the S/N ratio is carried out. Such processing makes it possible to pick up images with a wide dynamic range and a favorable S/N ratio.

According to the present configuration, when exposure control is carried out for each region, it is possible to decide the exposure time by merely referring to the periphery of such region. That is, to calculate the exposure time Tex1 of block 1, for example, only image information of block 1 is used. It is possible to set the exposure time of each block using only information in block units without carrying out a process that refers to the entire image of one frame or refers to an image region that covers a large part of such frame. This means that the control unit 208 can output the control data 209 immediately and successively from the blocks for which the calculation of exposure time has been completed to the image sensor 202 constructed for example of a CMOS image sensor.

That is, as described earlier, the control unit 208 sequentially and successively generates exposure time control data in block units based on luminance information in pixel regions, that is, block units (for example, line units or units of a plurality of lines) that form part of a preceding picked-up image and outputs the exposure time control data to the image sensor 202. The image sensor 202 inputs the exposure time control data in block units from the control unit 208 and carries out image acquisition based on exposure time control in block units that successively and sequentially uses the inputted exposure time control data.

Figure 11:
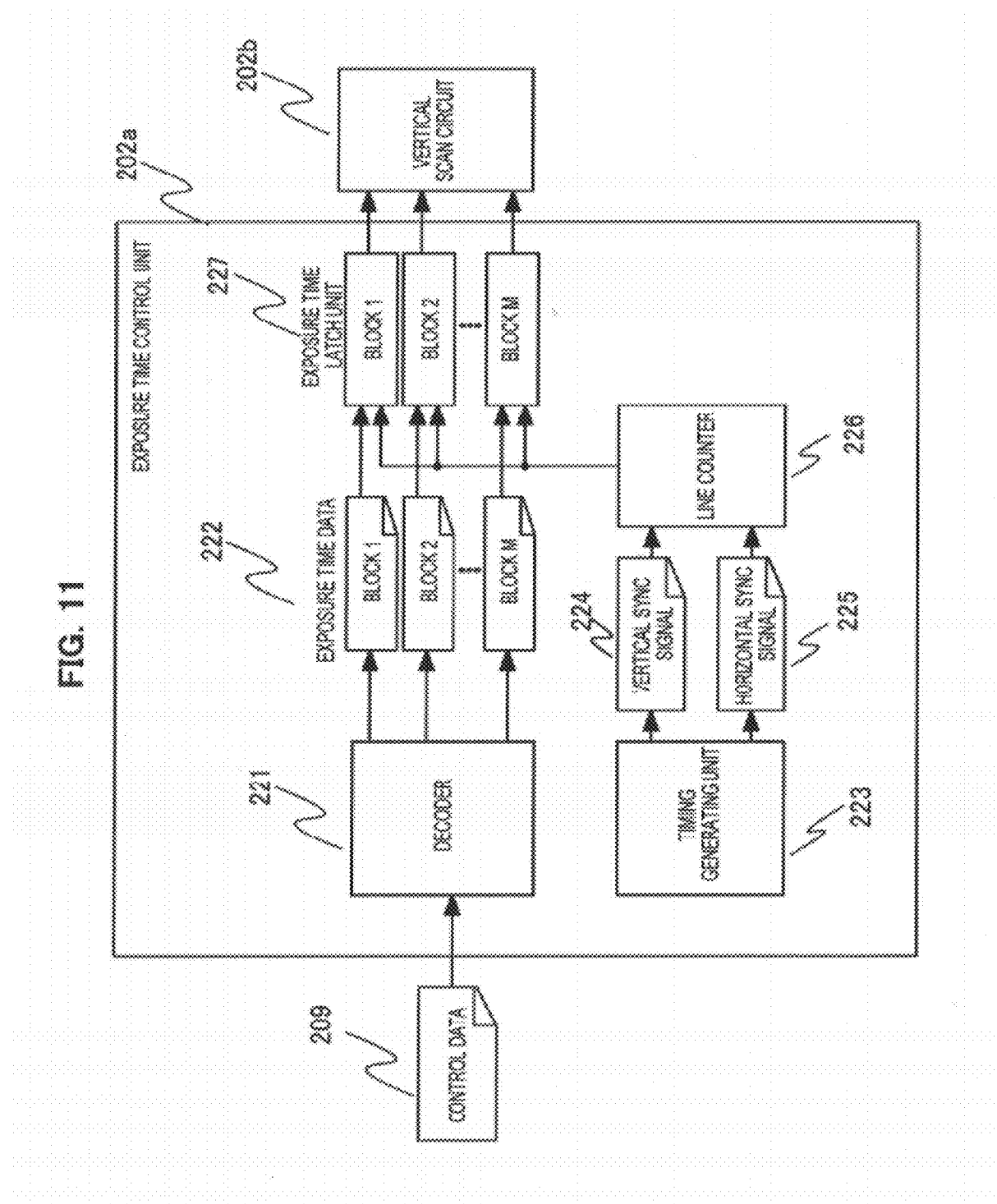
FIG. 11 is a diagram useful in explaining the configuration and processing of an exposure time control unit.

3. Example Operation of Image Sensor According to Exposure Control in Region Units Next, an example operation where the image sensor 202 inputs the control data 209 outputted from the control unit 208 and carries out an image pickup process by carrying out exposure control in region units will be described. FIG. 11 is a diagram useful in explaining an example configuration of the exposure time control unit 202a of the image sensor 202. The exposure time control unit 202a of the image sensor 202 inputs the control data 209 composed of exposure time setting information in region units from the control unit 208 and controls the vertical scan circuit 202b to set the exposure time in image region units (block units (for example, line units)).

A decoder 221 inputs the control data 209 composed of the exposure time setting information in region units from the control unit 208 and generates exposure time data 222 in block units.

A line counter 226 uses a vertical sync signal 224 and a horizontal sync signal 225 generated by a timing generating unit 223 to generate the line number that shows the present processing target.

An exposure time latch unit 227 inputs the line number generated by the line counter 226, generates exposure time latch timing for each block (pixel region), and outputs the exposure time data 222 to the vertical scan circuit 202b at different timing for each block (pixel region).

The vertical scan circuit 202b carries out electronic shutter control in block (pixel region) units in accordance with the exposure time data in block (pixel region) units outputted by the exposure time latch unit 227. More specifically, the vertical scan circuit 202b generates a line reset and line selection signal in line units, for example, and carries out electronic shutter control that realizes exposure time control in line units.

Figure 12:
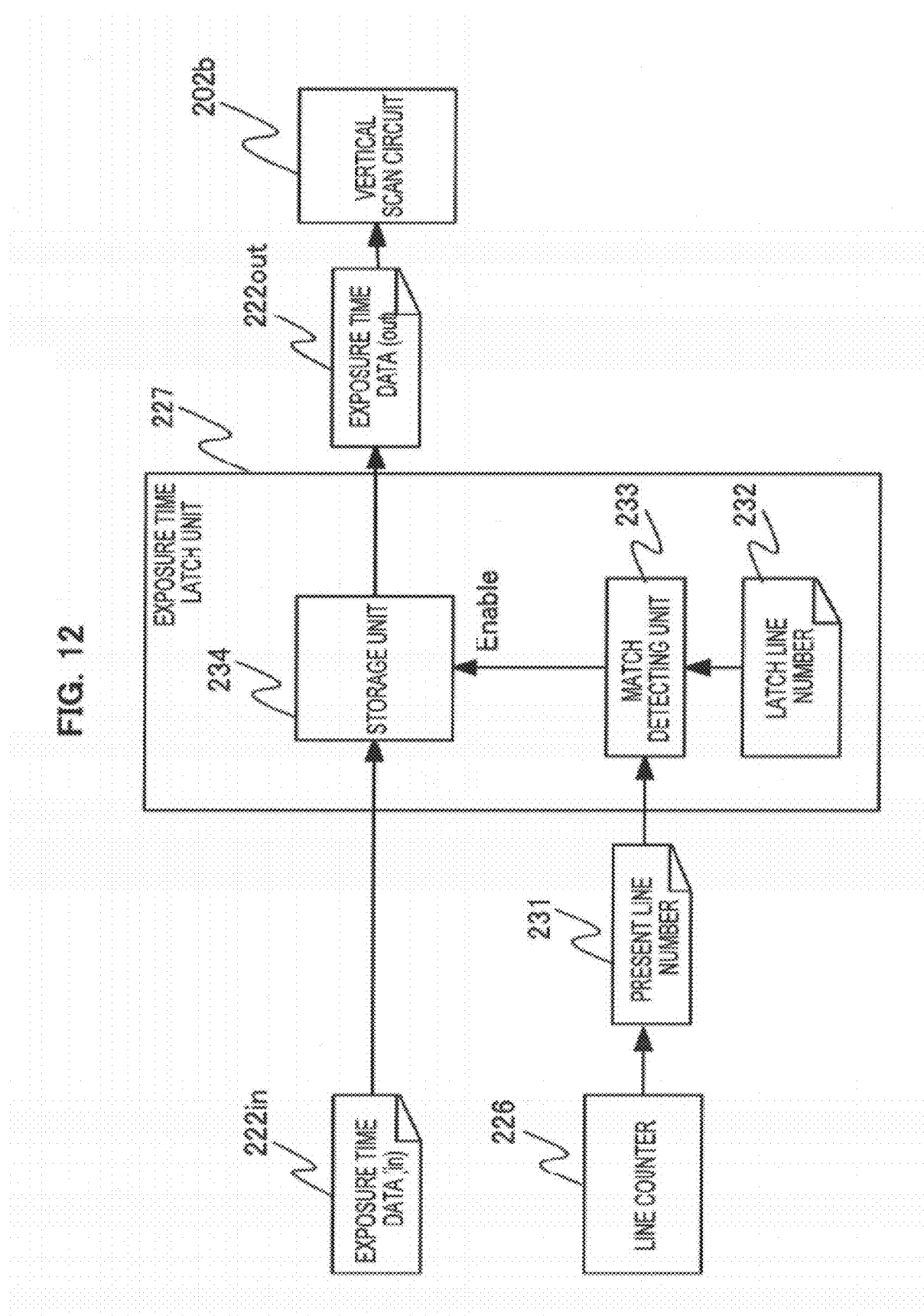
FIG. 12 is a diagram useful in explaining the configuration and example processing of an exposure time latch unit.

FIG. 12 is a diagram showing an example of the detail configuration of the exposure time latch unit 227 of one block. The exposure time latch unit 227 corresponding to one block outputs an exposure time control signal for one block to the vertical scan circuit 202b. As one example, if a block is one line, the exposure time control process is carried out in line units.

As shown in FIG. 12, the exposure time latch unit 227 fetches exposure time data (in) 222in in block units generated by the decoder 221 into a storage unit 234 and inputs the present line number 231 generated by the line counter 226.

The exposure time latch unit 227 stores a latch line number 232 of a line controlled using this particular exposure time latch unit 227 and determines, in a match detecting unit 233, whether the line number 231 inputted from the line counter 226 matches the latch line number 232 of the line controlled using this exposure time latch unit 227. If a match has been detected, exposure time data (out) 222out is outputted from the storage unit 234 to the vertical scan circuit 202b and exposure time control is carried out in block units in keeping with the exposure time data 222. Note that when implemented by a logic circuit, the storage unit 234 can be realized for example by a D flip-flop circuit with an enable port.

Figure 13:
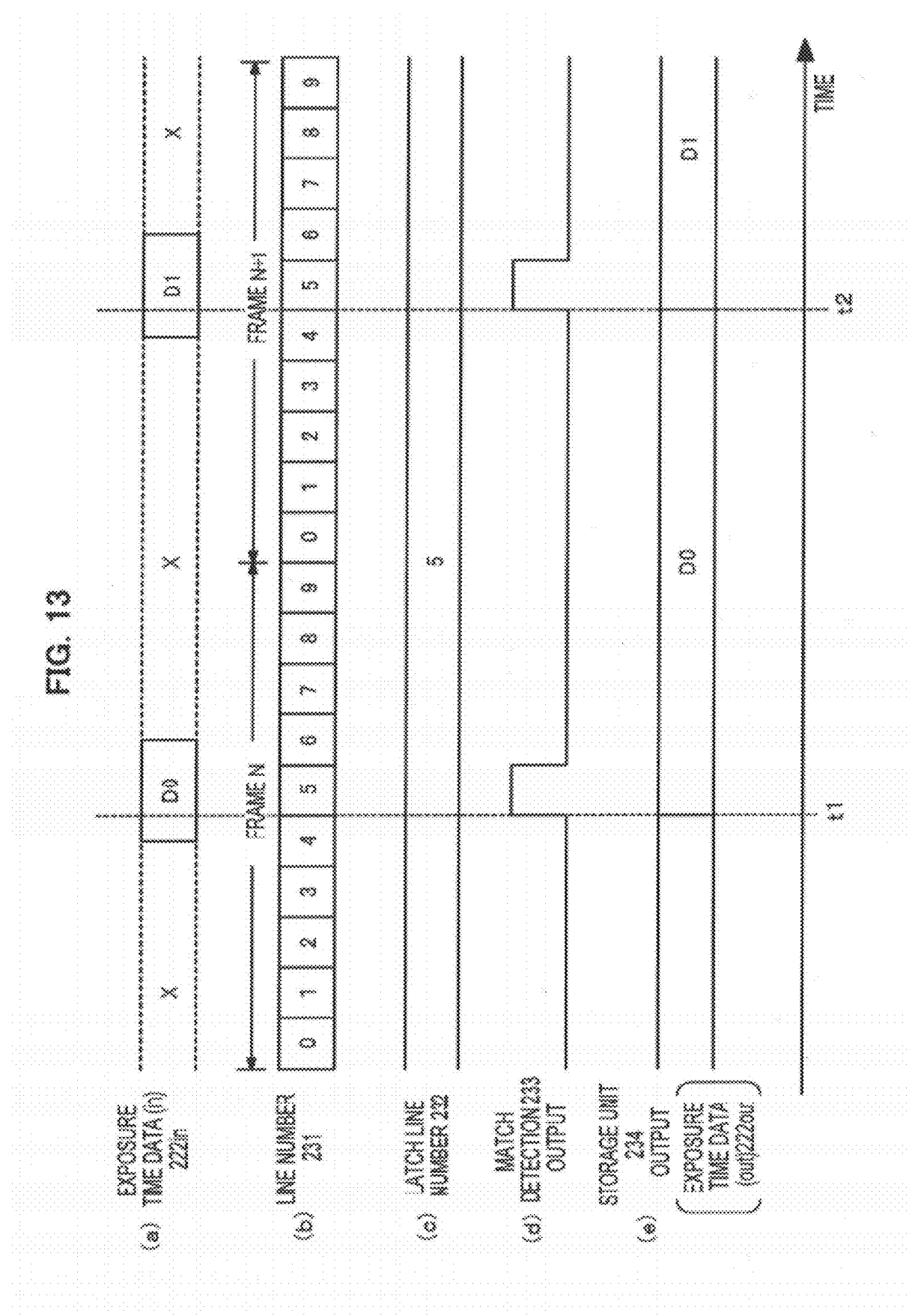
FIG. 13 is a timing chart showing an example of an operation sequence of the exposure time latch unit shown in FIG. 12.

FIG. 13 is a timing chart useful in explaining an operation sequence of the exposure time latch unit 227 shown in FIG. 12. The horizontal axis represents time (t) and therefore changes in the data mentioned below are shown on a time axis.

(a) "Exposure time data (in) 222in" inputted into the exposure time latch unit 227

(b) "Present line number 231" inputted into the exposure time latch unit 227

(c) "Latch line number 232" stored in the exposure time latch unit 227

(d) "Match detection signal output" of the match detecting unit 233

(e) Output from storage unit 234 (i.e., exposure time data (out) 222out)

Note that to simplify the explanation, the number of lines in each frame is set at 10. In FIG. 13, out of the period where an exposure time setting process is carried out for lines 0 to 9 of frame N and lines 0 to 9 of frame N+1, the processing sequence of a single exposure time latch unit 227 used for processing the fifth line is shown.

(a) The "exposure time data (in) 222in" inputted into the exposure time latch unit 227 is fetched at the timing when (d) the "match detection signal output" of the match detecting unit 233 detects that (b) the "present line number 231" inputted into the exposure time latch unit 227 matches (c) the "latch line number 232" stored by the exposure time latch unit 227, and is outputted from the storage unit 234 to the vertical scan circuit 202*b* and stored in the storage unit 234 until the same timing in the next frame.

Figure 14:
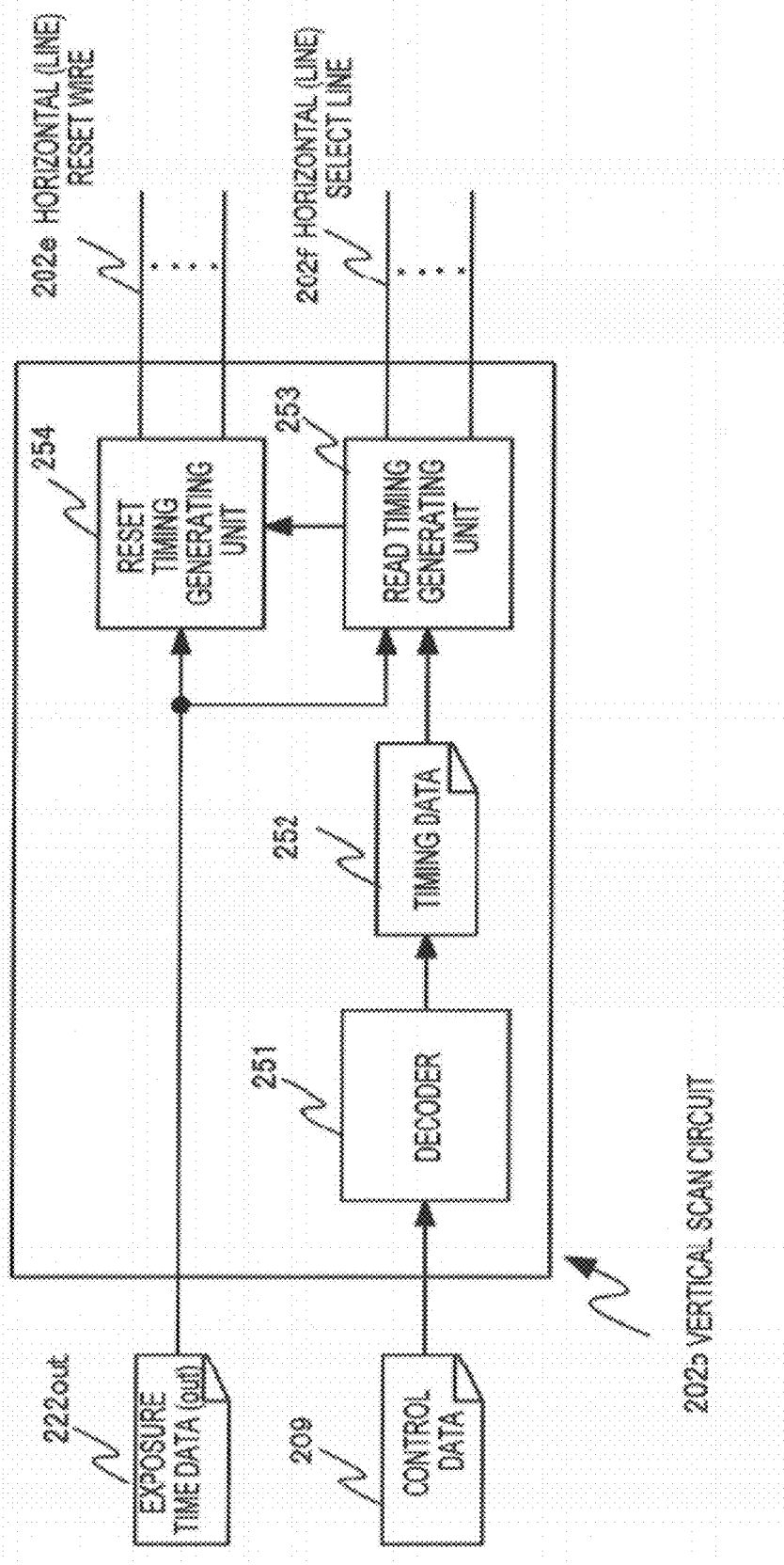
FIG. 14 is a diagram useful in explaining an example configuration of a vertical scan circuit.

FIG. 14 shows an example configuration of the vertical scan circuit 202*b*. A decoder 251 is used to extract the timing data 252 from the control data 209 provided from the periphery. As one example, information that is necessary for timing purposes, such as the number of output lines of the image, is extracted as the timing data 252.

Figure 15:
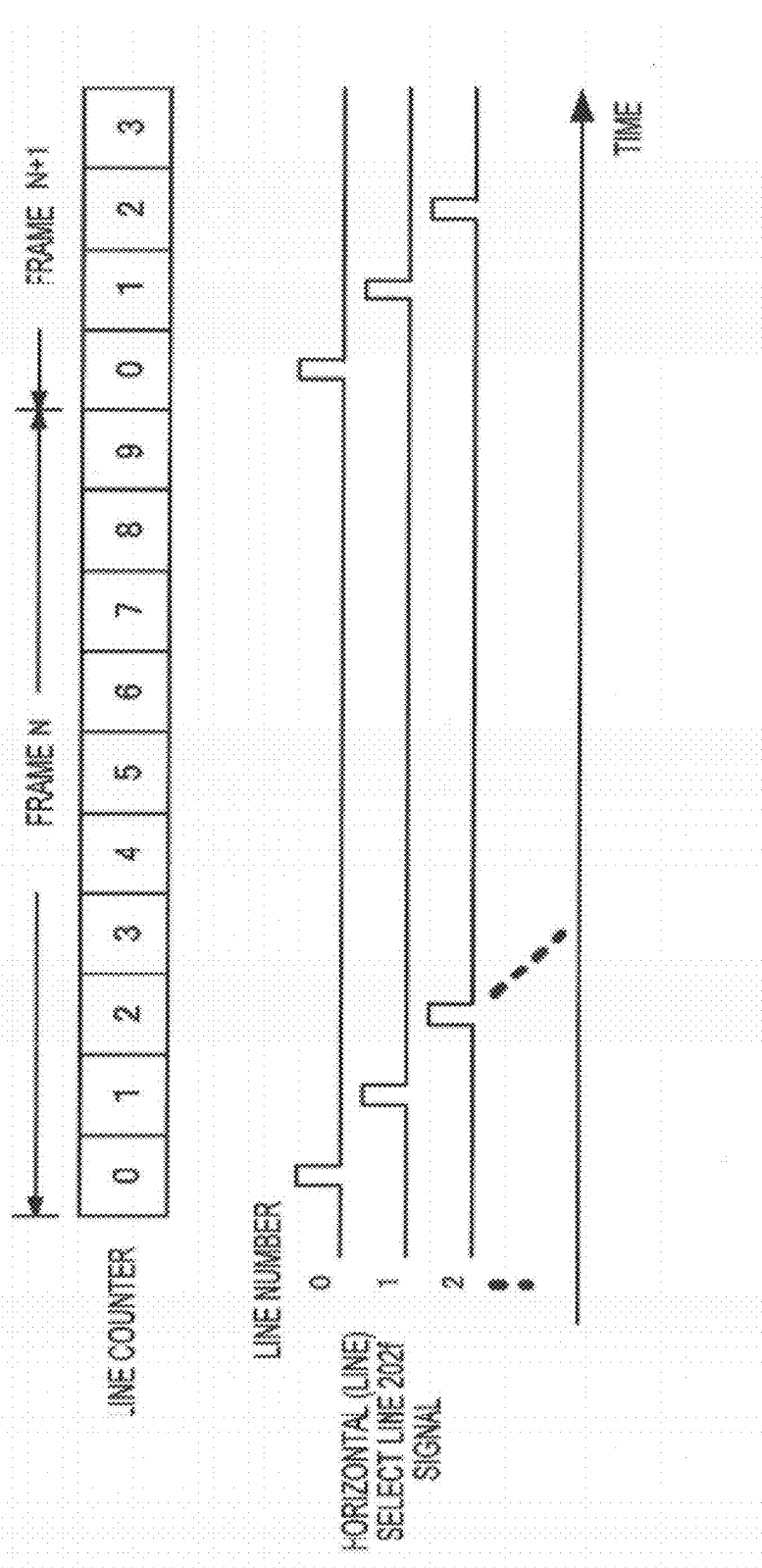
FIG. 15 is a diagram useful in explaining the processing of a read timing generating unit.

A read timing generating unit 253 successively outputs read timing to a horizontal (line) select wire 202*f* of each line based on the timing data 252. More specifically, as shown in FIG. 15 for example, the read timing corresponding to each line is generated inside the read timing generating unit 253 and the read timing is successively outputted to the horizontal (line) select wire 202*f* of each line.

A reset timing generating unit 254 inputs read timing corresponding to the respective lines generated by the read timing generating unit 253, calculates a reset time as an exposure start time in line units based on the exposure time data (out) 222out inputted from the exposure time latch unit 227 in order to control the exposure start time so as to set the exposure time given in the inputted exposure time data, generates a reset signal in line units, and outputs the reset signal to a horizontal (line) reset wire 202*e*.

Figure 16:
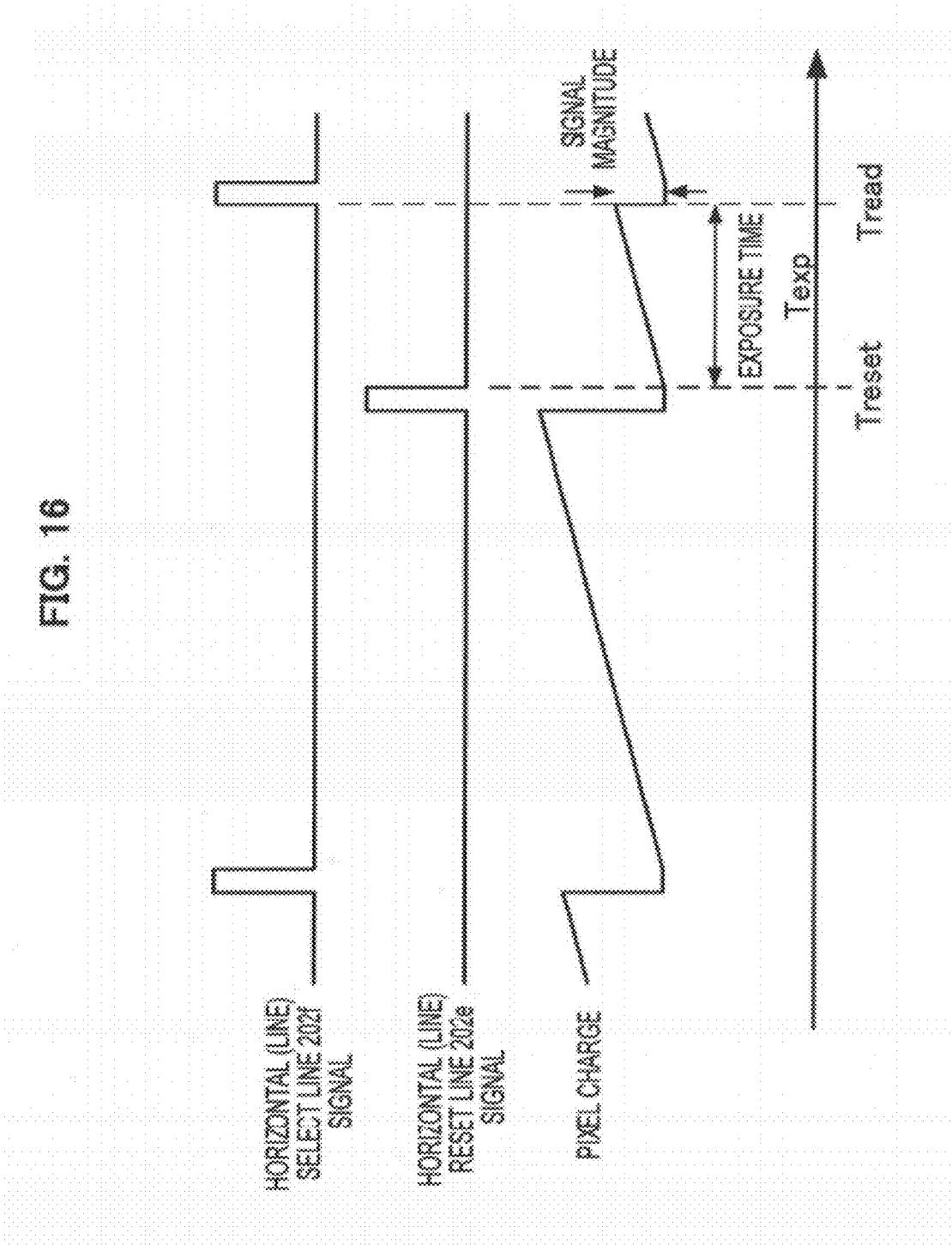
FIG. 16 is a diagram useful in explaining the relationship between the read timing, reset timing, and exposure time of an arbitrary line.

FIG. 16 shows the relationship between the read timing, the reset timing, and the exposure time of an arbitrary line. The reset timing (Treset) shown in FIG. 16 is the exposure start time from which charge accumulation starts for the pixel and the read timing (Tread) is the exposure end time when the accumulated signal is read out. That is, a relationship where the exposure time (Texp)=(Tread)−(Treset) is established.

Since exposure time data 241 and the read timing have been obtained, the reset timing generating unit 254 uses the reset timing (Treset)=Tread−Texp relationship to generate the reset timing and outputs a reset signal in accordance with the reset timing to the horizontal (line) reset wire 202*e* on a line-by-line basis.

Figure 17:
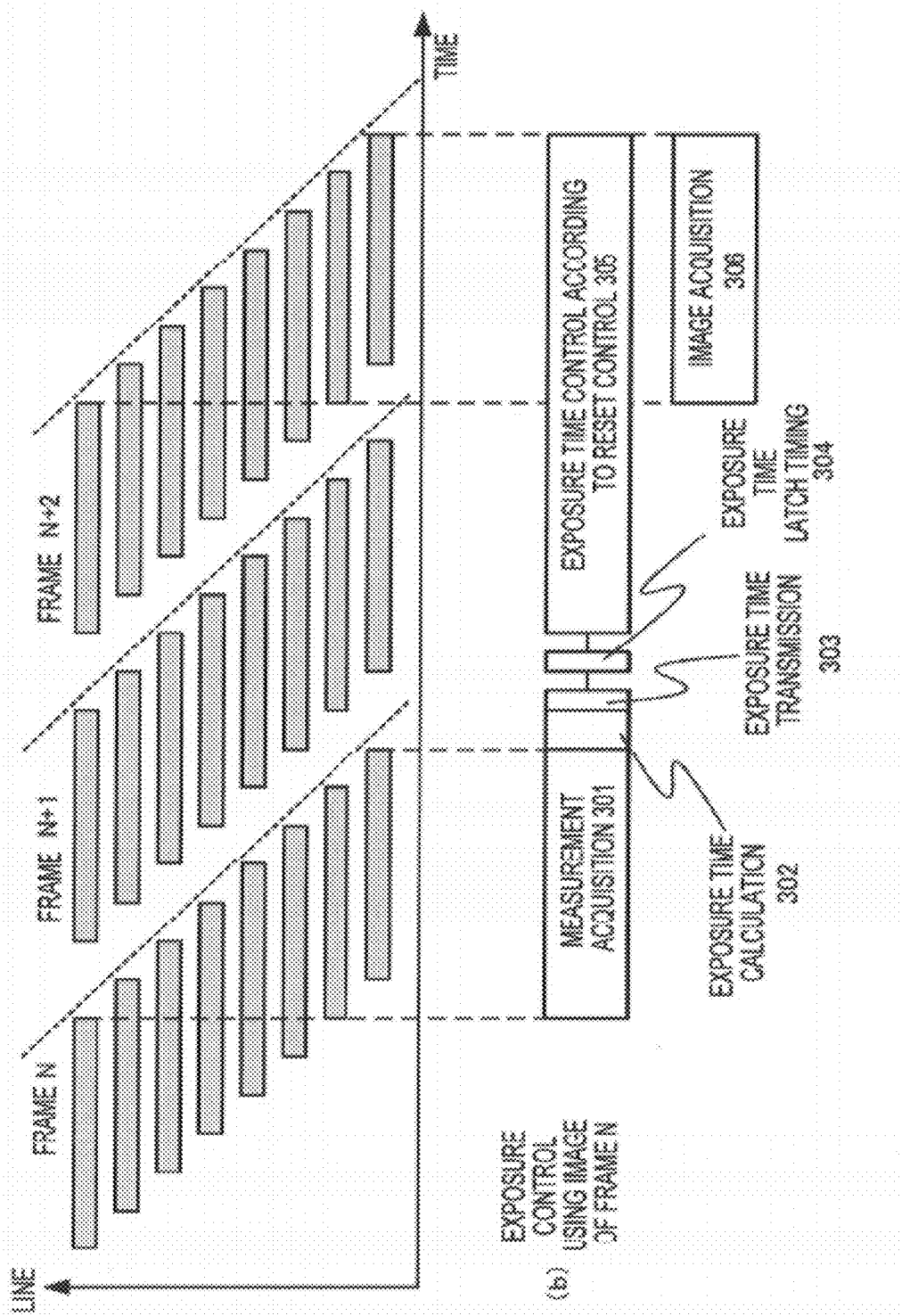
FIGS. 17A and 17B are diagrams useful in explaining an existing exposure time control sequence.
Figure 18:
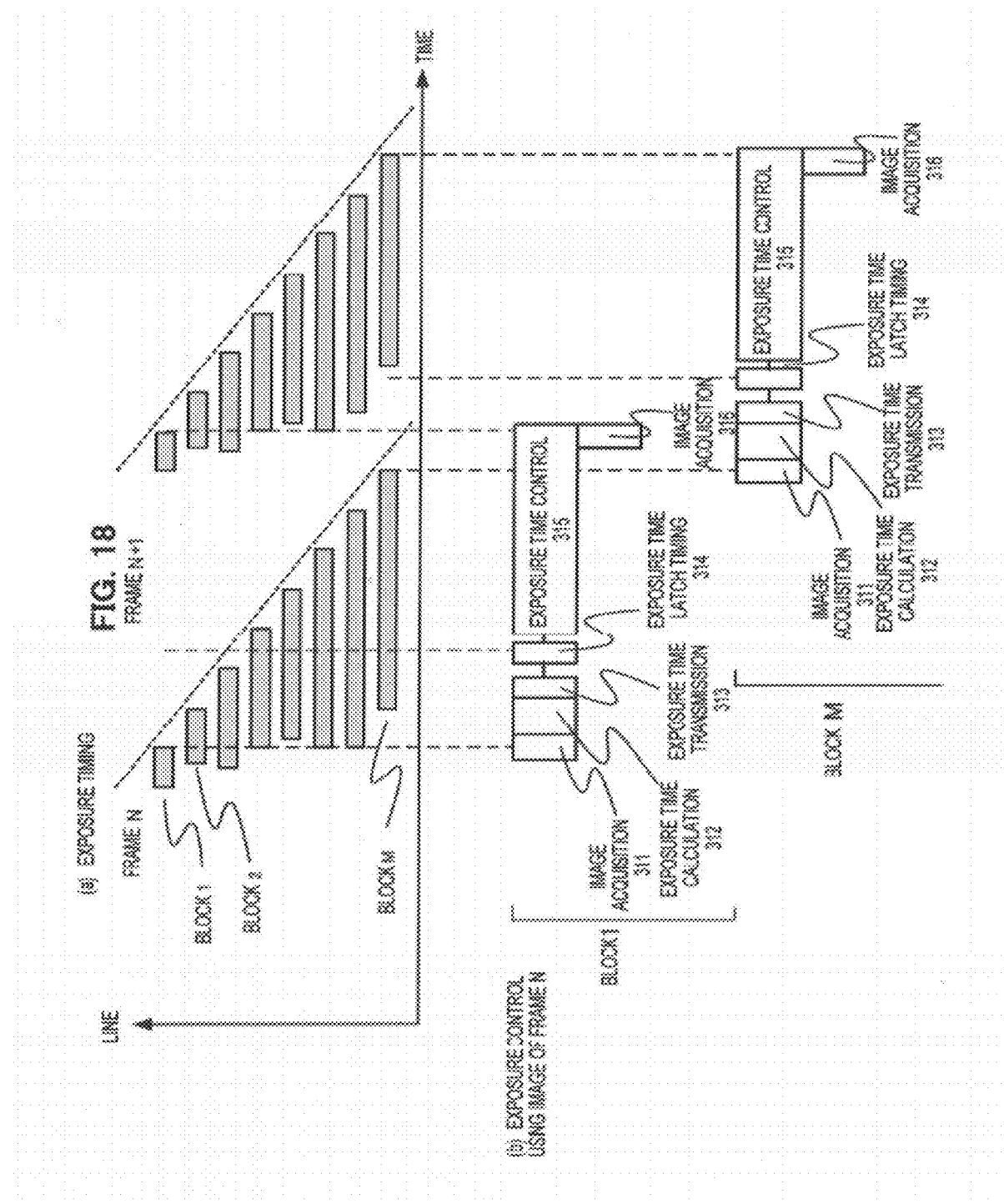
FIGS. 18A and 18B are diagrams useful in explaining an exposure time control sequence of an image pickup apparatus according to an embodiment of the present disclosure.

4. Comparison of Exposure Control Process According to an Embodiment of the Present Disclosure and Existing Exposure Control Process Next, the exposure control process according to an embodiment of the present disclosure and an existing exposure control process will be compared with reference to FIGS. 17A to 18B. FIGS. 17A and 17B are diagrams useful in explaining an example operation of an image sensor (CMOS image sensor) according to existing exposure control. FIGS. 18A and 18B are diagrams useful in explaining an example operation of the image sensor (CMOS image sensor) of the image pickup apparatus according to an embodiment of the present disclosure.

Figure 3:
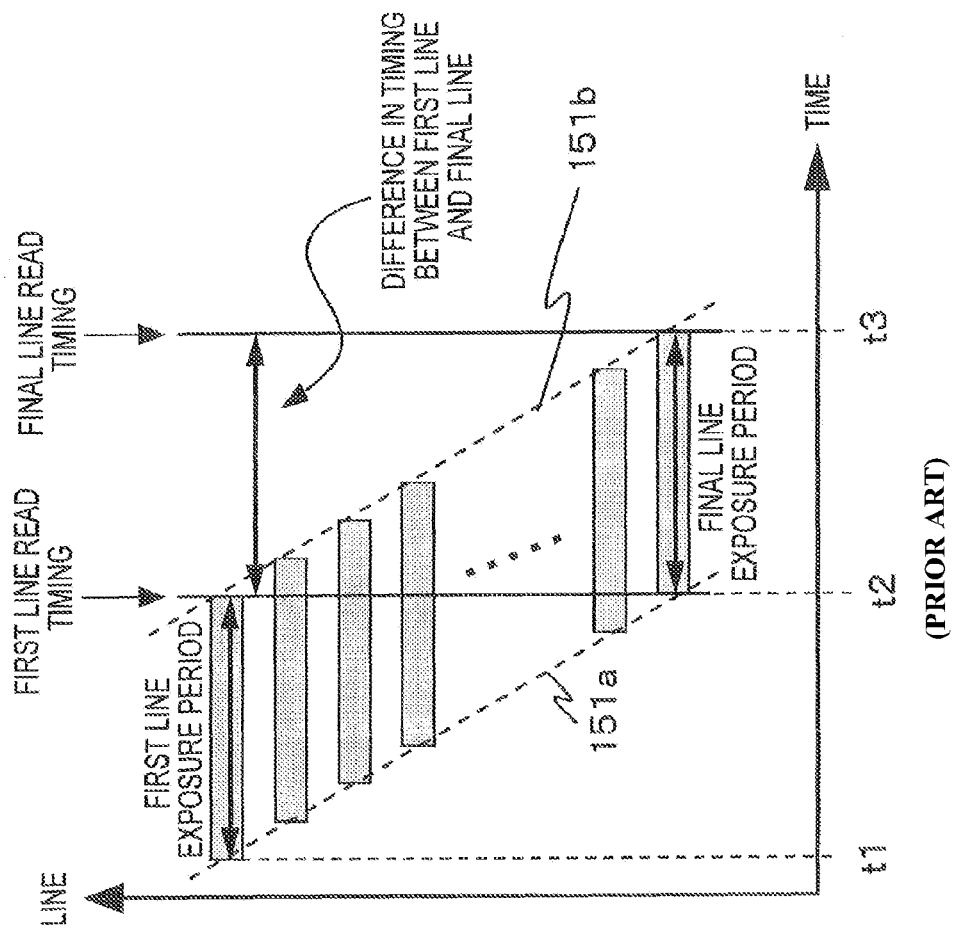
FIG. 3 is a diagram useful in explaining an image pickup processing sequence.
Figure 4:
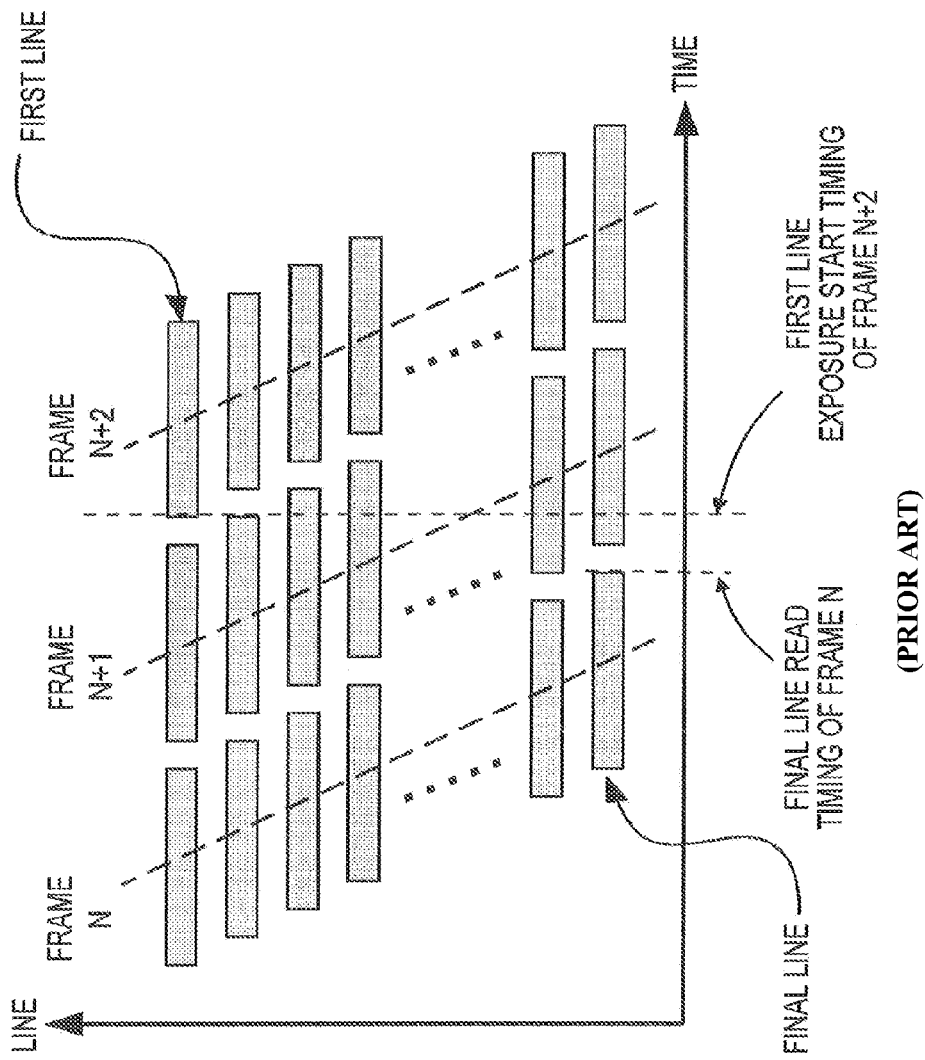
FIG. 4 is a diagram useful in explaining an image pickup processing sequence.

First, an example operation of an image sensor (CMOS image sensor) according to existing exposure control will be described with reference to FIGS. 17A and 17B. FIGS. 17A and 17B show an exposure control sequence carried out during an image pickup process for three frames numbered N to N+2 that are consecutively picked up. In the graph in FIG. 17A showing the exposure timing the vertical axis shows lines, the horizontal axis shows time, and exposure time in line units is shown for each line as a rectangular region. As described earlier with reference to FIGS. 3 and 4, the exposure time is set with a delay of a specified time from lines at the top to lines at the bottom.

FIG. 17B shows an exposure control process sequence on a time axis for the exposure control process that uses the image of frame N. The processes numbered 301 to 305 are processes executed as time passes. The content of such processes is as follows.

Measurement acquisition 301: the timing at which the image of frame N is outputted.

Exposure time calculation 302: the timing at which the exposure time is calculated based on the image acquired by the measurement acquisition 301.

Exposure time transmission 303: the timing at which the exposure time calculated in the exposure time calculation 302 is outputted to the image sensor (image sensor).

Exposure time latch timing 304: the timing at which the exposure time data inputted by the exposure time transmission 303 is latched inside the image sensor (image sensor). Here, the latch timing is generated before the start of exposure of the first line.

Exposure time control according to reset control 305: reset timing is generated based on the data latched in the exposure time latch timing 304 and is the period during which exposure control is carried out.

Although the processing in processes 301 to 305 is exposure time control carried out based on the picked-up image of frame N, image pickup of the frame N+1 will have already started at the start time of the exposure time control according to reset control 305. Accordingly, the exposure time control according to reset control 305 is not applied to the image pickup process of frame N+1. As a result, image acquisition 306 according to image pickup with such exposure control is carried out for the image of frame N+2.

In this way, in the exposure time control shown in FIG. 17, an image pickup process according to exposure time control that uses exposure time control data generated based on the picked-up image of frame N cannot be carried out for the frame (frame N+1) picked up immediately afterward and is instead carried out for the frame N+2 that follows two frames after frame N. In this way, with the existing method, a delay of at least two frames was produced.

FIGS. 18A and 18B are diagrams useful in explaining an example operation of an image sensor (CMOS image sensor) in the image pickup apparatus according to the present embodiment. In the same way as FIGS. 17A and 17B, FIG. 18A and 18B show an exposure control sequence carried out during an image pickup process for three frames numbered N to N+2 that are consecutively picked up.

In the graph in FIG. 18A showing the exposure timing the vertical axis shows lines, the horizontal axis shows time, and exposure time in line units is shown for each line as a rectangular region.

FIG. 18B shows an exposure control process sequence on a time axis in region (block) units for the exposure control process that uses the image of frame N. In the processing according to the present embodiment, by carrying out calculation, transmission, and latching for exposure time control separately for specified unit regions (in the present embodiment, lines) of an image, the delay time is reduced.

In FIGS. 18A and 18B, exposure control of the frame N+1 that is the following image pickup frame is realized using the image of frame N that is the preceding image pickup frame. Such exposure control is carried out in units of pixel regions (blocks). In the present embodiment, exposure control is carried out in line units. In FIGS. 18A and 18B, as representative examples, processing examples where exposure control (the setting of exposure time) is carried out for block 1 (line 1) of frame N+1 based on the image information of block 1 (line 1) of frame N and exposure control (the setting of exposure time) is carried out for block M (line M) of frame N+1 based on the image information of block M (line M) of frame N are shown.

In FIG. 18B, in the same way as FIG. 17B, an exposure control processing sequence on a time axis is shown for an exposure control process that uses the image of frame N. The processes numbered 311 to 316 are processes executed as time passes. Note that the processing proceeds with the same sequence (processes 311 to 316) for both block 1 and block M. The content of such processes is as follows.

Measurement acquisition 311: the timing at which the image of a block in frame N is outputted.

Exposure time calculation 312: the timing at which the exposure time of a block (line) is calculated based on the image (one block in frame N, in the present embodiment the image of one line unit) acquired by the measurement acquisition 311.

Exposure time transmission 313: the timing at which the exposure time of a block calculated in the exposure time calculation 312 is transmitted.

Exposure time latch timing 314: the timing at which the exposure time data of one processing block transmitted by the exposure time transmission 313 is latched inside the image sensor (image sensor). Here, the latch timing is generated before the start of exposure of such block.

Exposure time control 315: reset timing is generated in block (line) units based on the exposure time latch timing 314 and is the timing at which exposure control (control to start exposure) is carried out.

Image acquisition 316: the time at which the image of the block (line) currently subject to control is obtained by the exposure control in block (line) units carried out by the exposure control 315 described above.

For block 1, block M, and all of the other blocks (lines) shown in FIG. 18A, processing is carried out according to the same sequence described above.

With the configuration according to the present embodiment shown in FIGS. 18A and 18B, unlike FIGS. 17A and 17B, the exposure time control data is calculated for specified units, that is pixel region (or "block", or line in the present embodiment) units and exposure control successively starts in pixel region units. According to such processing, a configuration that carries out exposure control which applies exposure control data based on the preceding picked-up image to the following image pickup frame is realized.

In the exposure time control shown in FIGS. 18A and 18B, the image pickup process according to exposure time control which uses the exposure time control data generated based on the picked-up image of frame N can be carried out for the immediately following image pickup frame (frame N+1), which means it is possible to carry out exposure control with no delay.

To realize the control shown in FIGS. 18A and 18B, the image sensor 202 has a configuration that is capable of exposure control for each image region (or block (for example, line)) and also carries out control having fetched control data with different timing for each specified unit.

5. Modifications

Modifications to the embodiment described above will now be described. In the embodiment described above, an example configuration of an image pickup apparatus was described with reference to FIG. 5. The configuration shown in FIG. 5 is merely one example and other configurations are also possible. As one example, a configuration may be used where all of the processing shown in FIG. 5 is carried out inside the image sensor.

The image pickup apparatus according to the present embodiment is configured to carry out exposure control that sets a different exposure time in each region and as one example an example configuration that carries out exposure control in line units was described above with reference to FIG. 7. However, the regions (blocks) as exposure control units are not limited to line units or units of a plurality of lines, and may be set differently.

Figure 19:
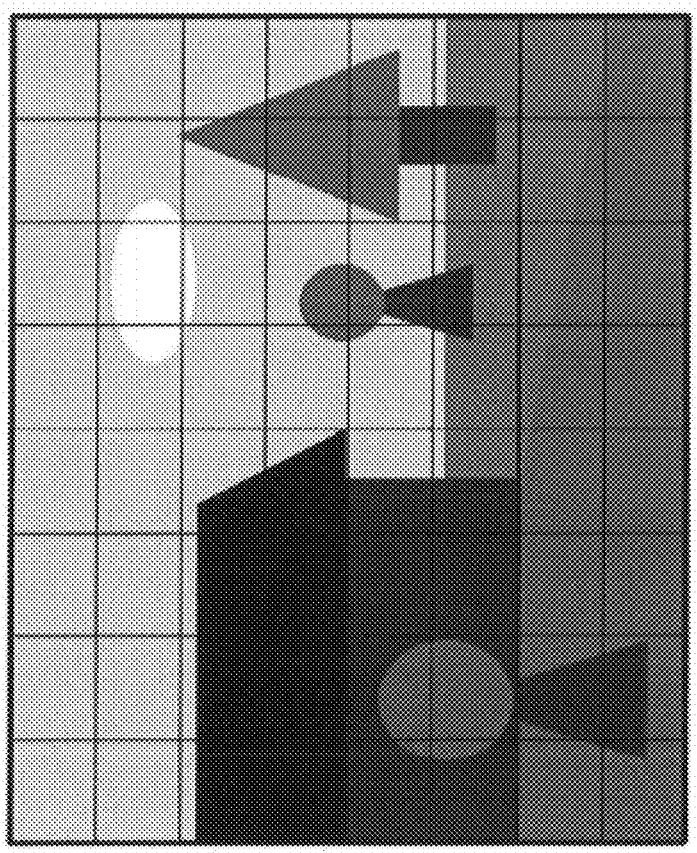
FIG. 19 is a diagram showing an example setting of blocks that are units for exposure control.
Figure 20:
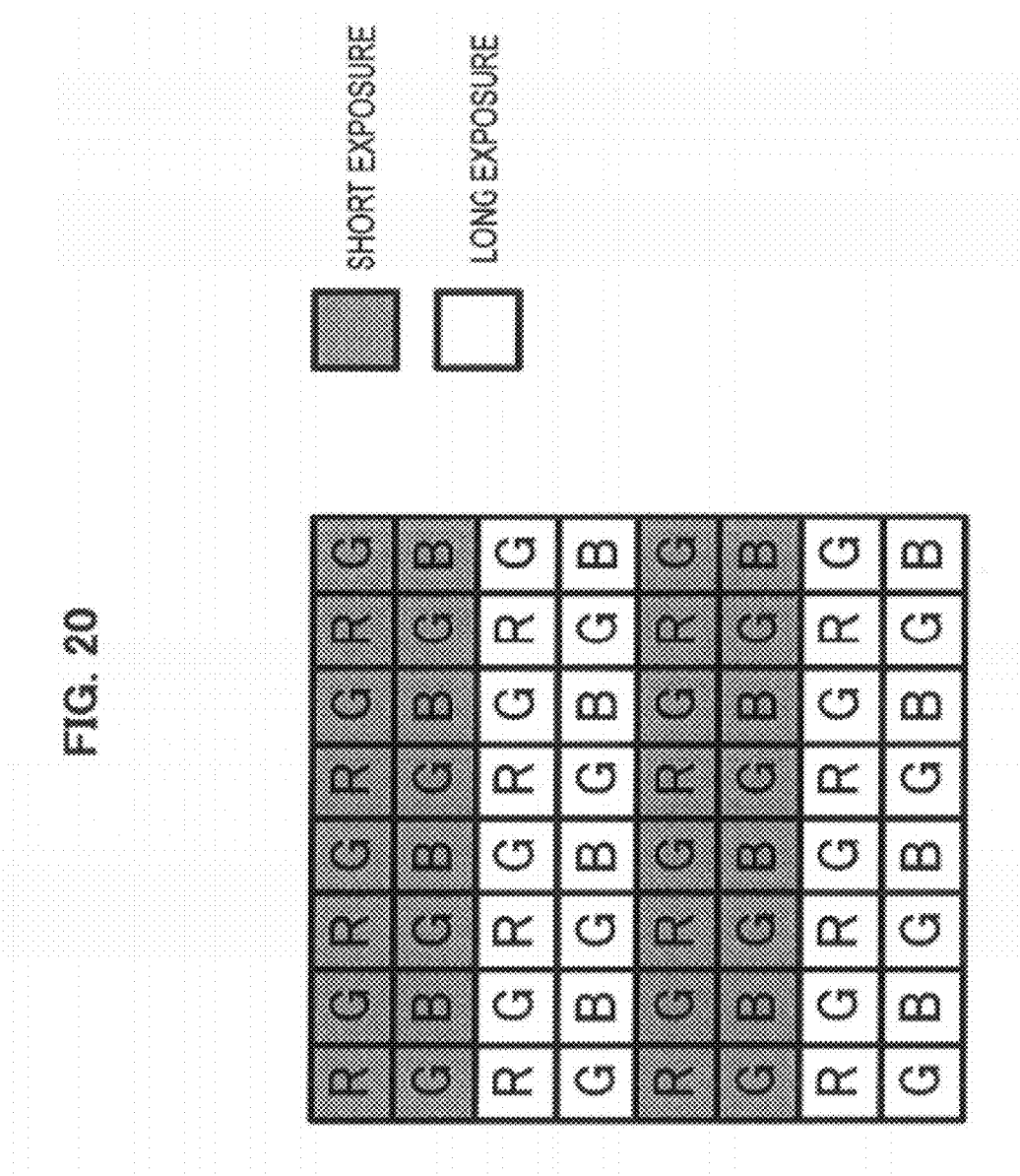
FIG. 20 is a diagram showing an example setting of blocks that are units for exposure control.
Figure 21:
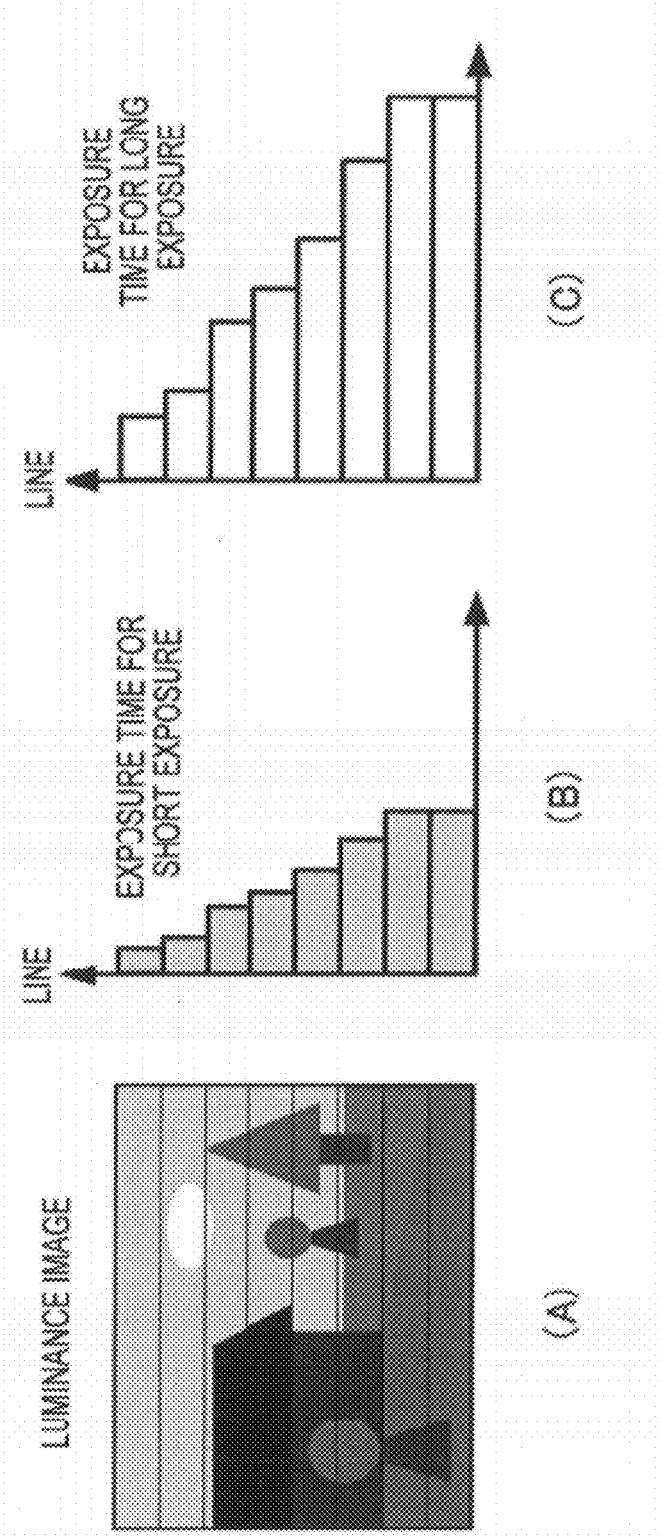
FIGS. 21A to 21C are diagrams useful in explaining an example of an exposure control process.

For example, as shown in FIG. 19, a configuration that carries out exposure control with blocks that are rectangular regions as units may be used. Also, as shown in FIG. 20, a configuration may be used which, in addition to exposure control based on the preceding picked-up image, sets short exposure blocks and long exposure blocks to cyclically carry out control over a plurality of sensitivities and generates an HDR image based on the resulting image. In addition, a configuration may be used which, in addition to exposure control based on the preceding picked-up image, carries out a short exposure image pickup process and a long exposure image pickup process for each region as shown in FIGS. 21A to 21C and generates an HDR image based on the resulting images.

Also, in the embodiment described above, as an example of an exposure control configuration of an image sensor, an example configuration of the exposure time latch unit 227 was described with reference to FIG. 12. In the above description, an example is described where the exposure time latch unit 227 stores the latch line number 232 showing the block to be controlled by this particular exposure time latch unit 227. However, the latch line number 232 does not have to be fixed and may be set so as to change in accordance with a luminance statistic for an image. Such changing process makes it possible to dynamically change the block being controlled.

6. Configuration of Exposure Control Based on Process Referring to a Plurality of Blocks In the embodiment described above, a configuration is used where the exposure time is set based on luminance information of the preceding picked-up image in block (for example, line) units as described above with reference to FIG. 18 and exposure time control over corresponding blocks in the next picked-up image is carried out.

That is, a configuration was described where the control unit 208 successively outputs exposure time control data to the image sensor 202 in block units based on luminance information in single block units of the preceding picked-up image and the image sensor 202 sequentially and successively uses the exposure time control data in single block units to carry out image acquisition based on exposure time control in block units.

That is, in the example shown in FIG. 18, for blocks 1 to M set in an image, exposure control is carried out corresponding to the blocks so that exposure control of an image region of block 1 of frame N+1 is carried out according to exposure control data based on the image region of block 1 of frame N, exposure control of an image region of block 2 of frame N+1 is carried out according to exposure control data based on the image region of block 2 of frame N, . . . , and exposure control of an image region of block M of frame N+1 is carried out according to exposure control data based on the image region of block M of frame N.

However, if exposure control is carried out in this way by referring to only local information, in cases such as when a bright object has made a large movement, the same subject may not be present in the same block region in frame N and frame N+1. In such a case, an exposure time set based on a preceding picked-up image is no longer appropriate, and problems such as the saturation of pixel values can occur.

To solve such problem, in some cases it is effective to set the exposure time by referring not only to local information but also a wider area, for example, a plurality of blocks. That is, by using a configuration that sets the exposure time by referring to a plurality of blocks, it is possible to precisely predict changes in luminance. However, when a wide area is referred to, there is the problem that image acquisition is time-consuming.

Figure 22:
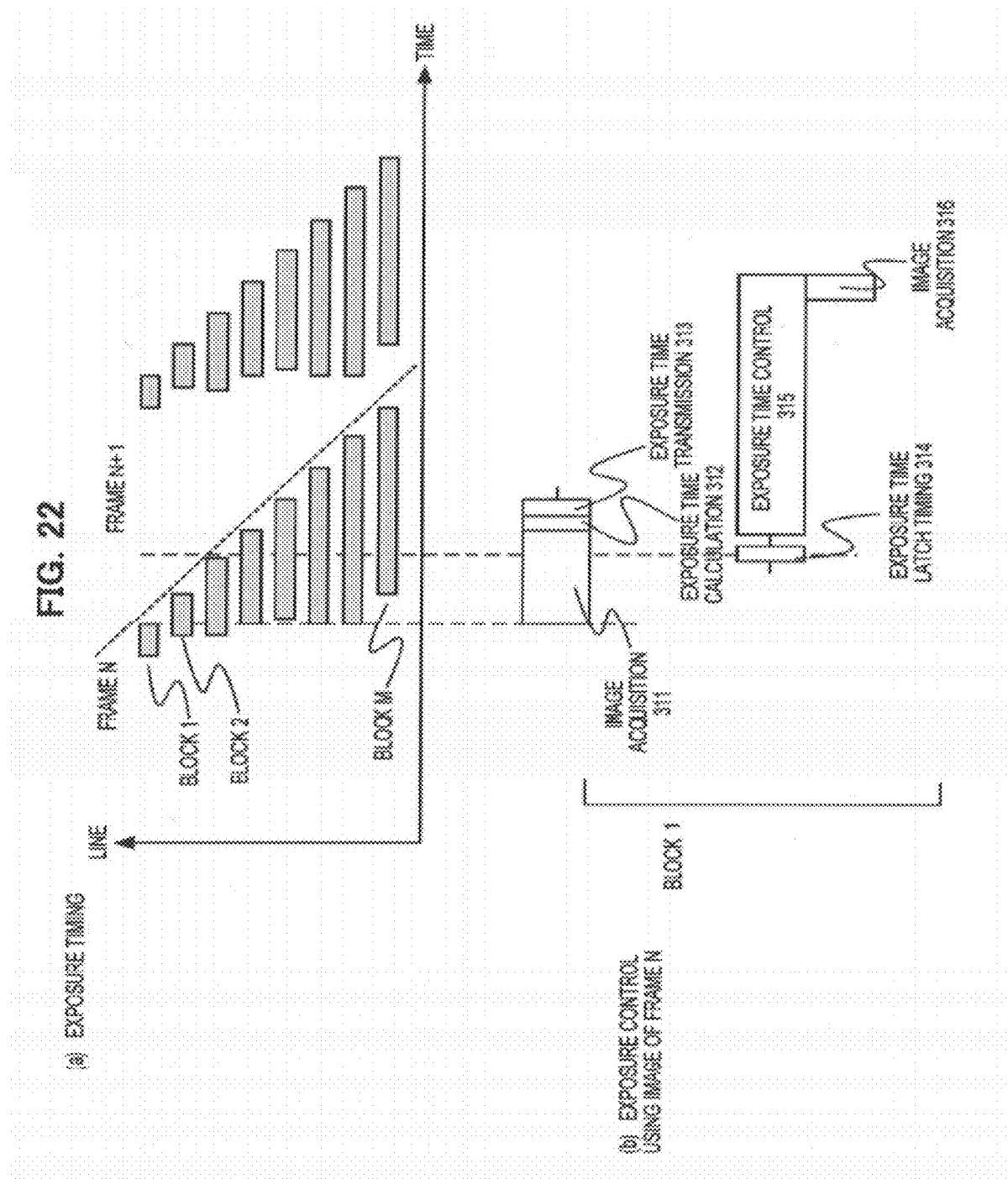
FIGS. 22A and 22B are diagrams useful in explaining a problem with an exposure time control sequence of an image pickup apparatus.

The above problem will first be described with reference to FIGS. 22A and 22B and then a configuration and processing sequence that solves the problem will be described with reference to FIGS. 23A to 25B.

First, the above problem, that is, the problem that image acquisition is time-consuming when a wide area is referred to will be described with reference to FIGS. 22A and 22B. FIG. 22A is a timing chart for a case where a setting is made to refer to a plurality of blocks, that is, blocks 1 to 3 when calculating the exposure control data of block 1 in FIG. 18A. FIG. 22B shows an exposure control sequence carried out during an image pickup process for two frames numbered N and N+1 that are consecutively picked up.

In the graph in FIG. 22A showing the exposure timing the vertical axis shows lines, the horizontal axis shows time and exposure time in line units is shown for each line as a rectangular region. FIG. 22B shows an exposure control process sequence on a time axis in region (block) units for the exposure control process that uses the image of frame N. Note that the numbers 1 to M are identifiers of pixel regions (or blocks, in the present example "lines") in a picked-up image.

In the same way as the example described with reference to FIGS. 18A and 18B, the settings shown in FIGS. 22A and 22B have exposure control successively started in specified units, that is, pixel region (or "block", in the present example, line) units. By carrying out such processing, this configuration carries out exposure control by applying exposure control data based on a preceding picked-up image to the following image pickup frame.

However, the calculation process for exposure time control data corresponding to each block refers to a plurality of blocks. That is, the exposure time of one block is decided based on the image information of a plurality of blocks. The example shown in FIG. 22B is an example where a process is carried out to decide the exposure time of one block in the following image pickup frame by referring to three blocks in the preceding image pickup frame.

In FIG. 22B, in the same way as FIG. 18B, an example of an exposure control process for block 1 (line 1) that is one block (line) is shown. Processes 311 to 316 shown in FIG. 22B are processes that are the same as processes 311 to 316 in FIG. 18B described earlier. However, in the example shown in FIG. 22B, the exposure time of one block of the next image pickup frame is decided with reference to three blocks of the preceding image pickup frame. The content of the respective processes is described below.

Image acquisition 311: the timing at which the image of a block of frame N is outputted. At this timing, an image of three consecutive blocks, that is, pixel region 1 (block 1) to pixel region 3 (block 3), that are an image region that forms part of the picked-up image N is outputted from the image sensor.

Exposure time calculation 312: the timing at which the exposure time of one block (line) of a following frame subjected to exposure control is calculated based on the image (the three blocks of frame N (in the present example, an image in line units)) acquired by the image acquisition 311. The exposure time of block 1 of a following picked-up image is calculated.

Exposure time transmission 313: the timing at which the exposure time of a block calculated by the exposure time calculation 312 is transmitted.

Exposure time latch timing 314: the timing at which the exposure time data of one processing block transmitted by the exposure time transmission 313 process is latched inside the image sensor (image sensor). Here, the latch timing is generated before the start of exposure of such block.

Exposure time control 315: reset timing is generated in block (line) units based on the exposure time latch timing 314 and is the timing at which exposure control (control to start exposure) is carried out.

Image acquisition 316: the time at which the image of the block (line) currently subject to control is obtained by exposure control in block (line) units carried out by the exposure control 315 described above.

In this example, the image acquisition 311 overlaps into output of block 3 of frame N. As a result, the exposure time calculation 312 and the exposure time transmission 313 are both delayed compared to the setting in FIG. 18B. As a result, if the exposure time latch timing 314 and the exposure time control 315 were set in the same way as in FIG. 18B, the exposure time latch timing 314 and the exposure time control 315 would be set at an earlier time than the exposure time transmission 313. Such processing cannot be executed in reality. That is, with the sequence shown in FIG. 22, exposure control based on the image in frame N cannot be carried out in the following frame N+1 and an exposure time calculated based on the image of a plurality of blocks in frame N cannot be used during image pickup of frame N+1 and can only be used after the processing advances to image pickup of frame N+2.

Figure 23:
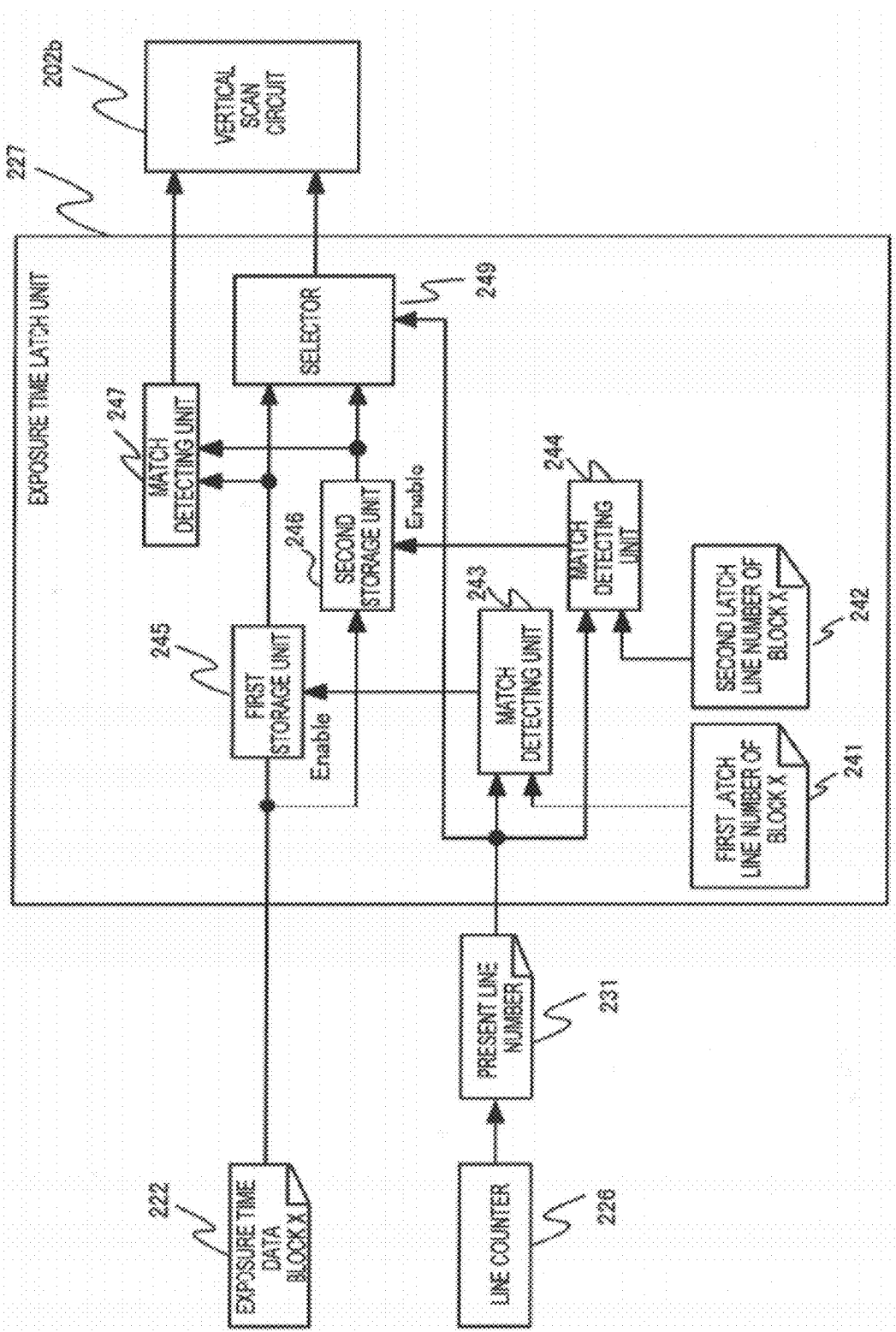
FIG. 23 is a diagram useful in explaining the configuration and example processing of an exposure time latch unit.
Figure 24:
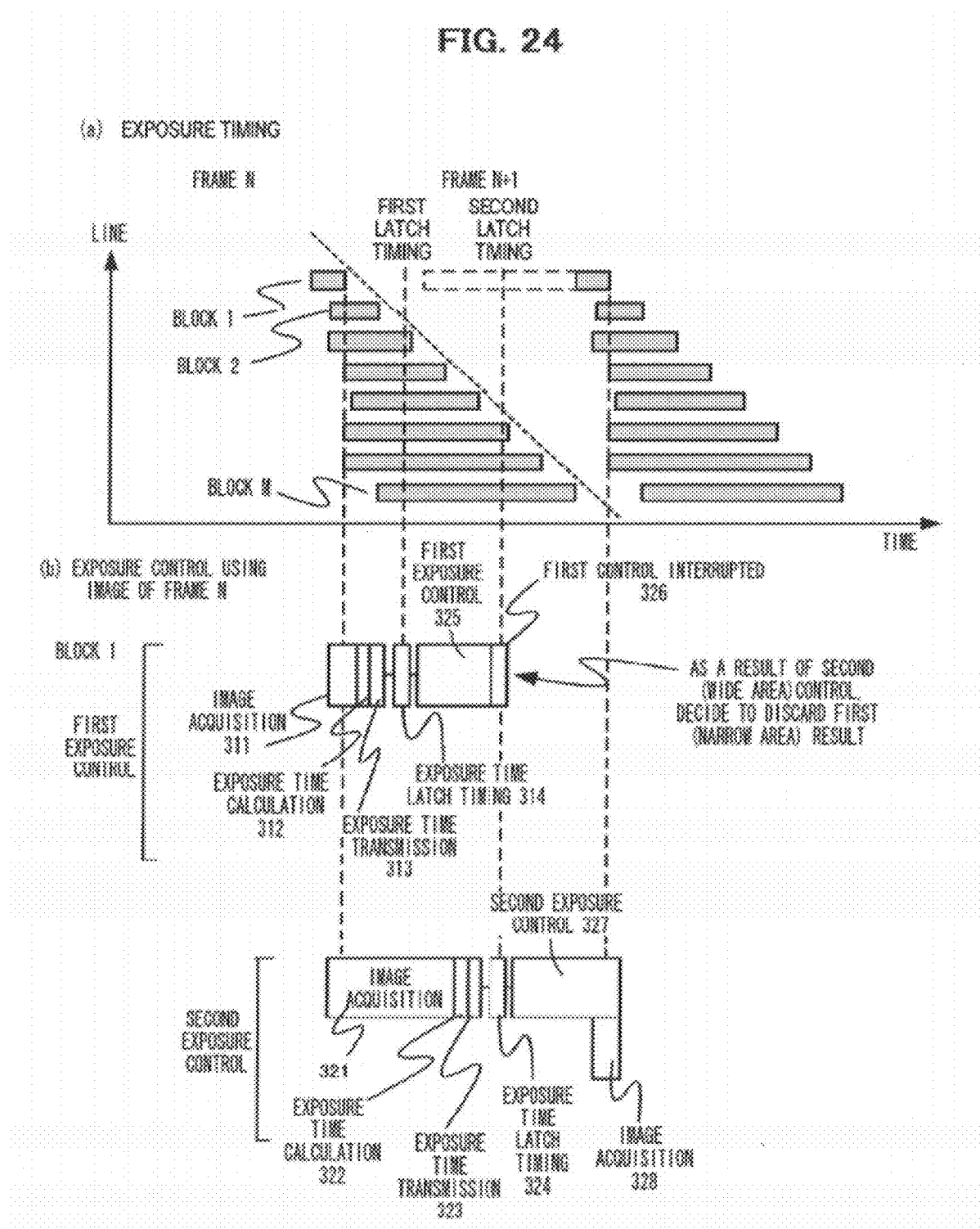
FIGS. 24A and 24B are diagrams useful in explaining an example of an exposure time control sequence of an image pickup apparatus according to an embodiment of the present disclosure.

The configuration of an exposure time latch unit 227 that solves this problem will now be described with reference to FIG. 23. The exposure time latch unit 227 shown in FIG. 23 is a configuration of one exposure time latch unit 227 of the exposure time control unit 202a shown in FIG. 11 described earlier. By using an exposure time latch unit 227 such as that shown in FIG. 23 in place of the exposure time latch unit 227 described with reference to FIG. 12, the problem described above with reference to FIGS. 22A and 22B is solved.

The exposure time latch unit 227 shown in FIG. 23 receives exposure control time data corresponding to the respective blocks at a plurality of different timings, stores the exposure control time data in the storage units 245 and 246, and outputs the exposure control time data via a selector 249 to the vertical scan circuit 202b.

More specifically, (1) first exposure control time data calculated from only the image data of one block in the preceding picked-up image frame is outputted from the first storage unit 245 shown in FIG. 23. (2) Second exposure control time data calculated from the image data of a plurality of blocks in the preceding picked-up image frame is outputted from the second storage unit 246 shown in FIG. 23. Such exposure time control data is generated and selectively used. The data (1) is the same as the data described in the embodiment given earlier.

For example, when the brightness of the subject does not change, processing that uses only the first storage unit 245, that is, the same processing as that described earlier with reference to FIG. 12 is carried out. Meanwhile in a case where it is expected that the brightness of the subject will change and saturation will occur in the next exposure, second exposure control time data (the exposure time data 222) calculated from the image data of a plurality of blocks is sent, the second storage unit 246 latches such data at the timing of a second latch line number 242, and exposure control is carried out according to an exposure time calculated based on a plurality of blocks.

If the block to be processed using this particular exposure time latch unit 227 is the first line, for example, the first latch line number 241 of block X shown in FIG. 23 is set so that the line number is 1. Also, if the exposure time data stored in the second storage unit 246 is exposure time data calculated based on an image in units of a plurality of blocks (for example, three blocks (three lines)) the second latch line number 242 of block X shown in FIG. 23 is set so that the line number is 3.

Note that since the vertical scan circuit 102 may have to carry out reset control again when the exposure time data in the first storage unit 245 and the second storage unit 246 differs, a match detecting unit 247 detects a match and outputs information showing the match.

FIGS. 24A and 25A are timing charts like FIG. 22A, and are timing charts for processing that uses the exposure time latch unit 227 with the configuration shown in FIG. 23. Like FIG. 22B, FIGS. 24B and 25B show exposure control sequences during image pickup of the two frames numbered N and N+1 that are consecutively picked up.

In the graphs in FIGS. 24A and 25A showing the exposure timing, the vertical axis shows lines, the horizontal axis shows time, and exposure time in line units is shown for each line as a rectangular region. FIGS. 24B and 25B show an exposure control process sequence on a time axis in region (block) units for the exposure control process that uses the image of frame N. Note that the numbers 1 to M are identifiers of pixel regions (or "blocks", in the present example, lines) in a picked-up image.

In the same way as in the example described with reference to FIGS. 18A and 18B, the settings shown in FIGS. 24A to 25B have exposure control successively started in specified units, that is, in pixel region (or "block", in the present example, line) units. By carrying out such processing, this configuration carries out exposure control by applying exposure control data based on a preceding picked-up image to the following image pickup frame.

The processing sequences shown in FIGS. 24B and 25B will now be described in brief. First, the exposure time is decided by referring to only one block, with such exposure time being outputted as first data from the first storage unit 245 via the selector 249 to the vertical scan circuit 202b. After this, the exposure time is decided by referring to a larger block, in the example in FIGS. 24B and 25B, three blocks, and if saturation for example appears possible, such exposure time is outputted as second data from the second storage unit 246 via the selector 249 to the vertical scan circuit 202b.

FIG. 24B is a timing chart showing an example of an exposure control process that discards the exposure time decided by referring to only one block and instead uses the exposure time decided by referring to three blocks during image pickup of the next frame. FIG. 25B is a timing chart showing an example of an exposure control process set so as to use the exposure time decided by referring to only one block and to not use the exposure time decided by referring to three blocks.

The processing shown in FIG. 24B will now be described. FIG. 24B is a timing chart showing an example of an exposure control process that discards the exposure time decided by referring to only one block and instead uses the exposure time decided by referring to three blocks during image pickup of the next frame.

In the exposure control shown in FIG. 24B that uses the image of frame N, a processing example is shown where the exposure time decided by referring to only one block (i.e., line 1) of the frame N carried out as the "first exposure control" is discarded and an exposure time calculation result found by referring to three blocks (i.e., lines 1 to 3) carried out as the "second exposure control" is used during image pickup of the next frame.

Processes 311 to 325 carried out as the "first exposure control" will now be described.

Image acquisition 311: the timing at which the image of block 1 (i.e., line 1) of frame N is outputted. At this timing, an image of block 1 (line 1) that is a pixel region forming part of the picked-up image N is outputted from the image sensor.

Exposure time calculation 312: the timing at which the exposure time of one block (line) of a following frame subjected to exposure control is calculated based on the image (one block of frame N (in the present example, line 1)) acquired by the image acquisition 311. Here, the exposure time of block 1 of the following picked-up image is calculated.

Exposure time transmission 313: the timing at which the exposure time of the block calculated by the exposure time calculation 312 is transmitted.

Exposure time latch timing 314: the timing at which the exposure time data of one processing block transmitted by the exposure time transmission 313 process is latched inside the image sensor (image sensor). Here, the latch timing is generated before the start of exposure of such block.

First exposure time control 325: reset timing is generated in block (line) units based on the exposure time latch timing 314 and is the timing at which exposure control (control to start exposure) is carried out. The processing up to this point corresponds to "first exposure control".

In parallel with such processing, the "second exposure control" shown at the bottom of FIG. 24B is carried out. In this process, the exposure time decided by referring to a plurality of blocks (in the present example, blocks 1 to 3, (lines 1 to 3)) is used as the exposure control time for block 1 (line 1) of the next frame N+1.

Image acquisition 321: the timing at which the image of a block of frame N is outputted. At this timing, an image of three consecutive blocks, that is, pixel region 1 (block 1) to pixel region 3 (block 3), that are an image region forming part of the picked-up image N is outputted from the image sensor.

Exposure time calculation 322: the timing at which the exposure time of one block (line) in a following frame subjected to exposure control is calculated based on the image (the three blocks in frame N (in the present example, an image in line units)) acquired by the image acquisition 311. Here, the exposure time of block 1 of the following picked-up image is calculated.

Exposure time transmission 323: the timing at which the exposure time of the block calculated by the exposure time calculation 322 is transmitted.

Exposure time latch timing 324: the timing at which the exposure time data of one processing block transmitted by the exposure time transmission 323 process is latched inside the image sensor (image sensor). Here, the latch timing is generated before the start of exposure of such block.

Second exposure time control 327: reset timing is generated in block (line) units based on the exposure time latch timing 324 and is the timing at which exposure control (control to start exposure) is carried out.

Image acquisition 328: the time at which the image of the block (line) currently subject to control is obtained by exposure control in block (line) units carried out by the exposure control 327 described above. This process is carried out as exposure control of the next image pickup frame based on the second exposure control, that is, control based on an exposure time decided with reference to a plurality of blocks.

Next, an example of an exposure control process set so as to use the exposure time decided by referring to only one block and to not use the exposure time decided by referring to three blocks will be described with reference to FIG. 25B.

In FIG. 25B, as exposure control that uses the image of frame N, an example is shown where an exposure time decided by referring to only one block (line 1) of frame N carried out as the "first exposure control" is used in the next exposure time control and the exposure time calculation process that refers to three blocks (line 1 to 3) carried out as the "second exposure control" is stopped.

Processes 311 to 328 carried out as the "first exposure control" will now be described.

Image acquisition 311: the timing at which the image of block 1 (i.e., line 1) of frame N is outputted. At this timing, an image of block 1 (line 1) that is a pixel region forming part of the picked-up image N is outputted from the image sensor.

Exposure time calculation 312: the timing at which the exposure time of one block (line) of a following frame subjected to exposure control is calculated based on the image (one block of frame N (in the present example, line 1)) acquired by the image acquisition 311. Here, the exposure time of block 1 of the following picked-up image is calculated.

Exposure time transmission 313: the timing at which the exposure time of the block calculated by the exposure time calculation 312 is transmitted.

Exposure time latch timing 314: the timing at which the exposure time data of one processing block transmitted by the exposure time transmission 313 process is latched inside the image sensor (image sensor). Here, the latch timing is generated before the start of exposure of such block.

First exposure time control 325: reset timing is generated in block (line) units based on the exposure time latch timing 314 and is the timing at which exposure control (control to start exposure) is carried out.

Image acquisition 328: an image acquisition process of block 1 (line 1) of the frame N+1 picked up with the exposure time decided by the second exposure control. The processing up to this point corresponds to the "first exposure control".

In parallel with such processing, the "second exposure control" shown at the bottom of FIG. 25B is carried out. In this process, the exposure time decided with reference to a plurality of blocks (in the present example blocks 1 to 3 (lines 1 to 3) is used as the exposure control time for block 1 (line 1) of the next frame N+1.

Image acquisition 321: the timing at which the image of a block in frame N is outputted. At this timing, an image of three consecutive blocks, that is, pixel region 1 (block 1) to pixel region 3 (block 3), that are a pixel region forming part of the picked-up image N is outputted from the image sensor.

Exposure time calculation 322: the timing at which the exposure time of one block (line) of a following frame subjected to exposure control is calculated based on the image (the three blocks of frame N (in the present example, an image in line units)) acquired by the image acquisition 311. Here, the exposure time of block 1 of the following picked-up image is calculated. At this time, since image pickup of frame N+1 will have started based on the first exposure control, the processing of the second exposure control is cancelled.

In the processing described with reference to FIGS. 24B and 25B, the exposure control signal output timing is set at two different timings. One is the output of exposure control data calculated by referring to one block and the other is the output of exposure control data calculated by referring to a plurality of blocks. The output timing of the second control signal corresponding to the exposure time generated by referring to a plurality of blocks is later than the output timing of the first control signal corresponding to the exposure time generated by referring to a single block.

For example, if the brightness of the subject does not change, a process that uses the output of the exposure control data calculated by referring to a single block, that is, only the first storage unit 245 shown in FIG. 23 is carried out in the same way as described earlier with reference to FIG. 12. Meanwhile, if the brightness of the subject changes and saturation is expected to occur during the next exposure, exposure control data calculated based on a plurality of blocks, that is data from the second storage unit 246 shown in FIG. 23 is latched at the timing of the second latch line number 242 and exposure control is carried out according to the exposure time calculated based on such plurality of blocks.

By carrying out such control, even if the luminance of the same pixel region in consecutively picked-up image frames changes due to the presence of a moving subject or the like, it will be possible to calculate the luminance and set the exposure time based on the information of a plurality of blocks and thereby realize appropriate exposure control.

7. Conclusion

The configuration of the present disclosure has been described in detail above with reference to specific embodiments. It should be understood by those skilled in the art that various modifications, combinations, sub-combinations and alterations may occur depending on design requirements and other factors insofar as they are within the scope of the appended claims or the equivalents thereof.

Additionally, the technology disclosed in the present specification may be configured as follows.

(1) An image pickup apparatus including:

a control unit generating exposure time control data in which an exposure time of an image sensor is set in pixel region units; and an image sensor inputting the exposure time control data and carrying out image acquisition based on exposure time control in the pixel region units, wherein the control unit successively and sequentially generates the exposure time control data in region units based on luminance information in the pixel region units that form part of a preceding picked-up image and outputs the exposure time control data to the image sensor, and the image sensor inputs the exposure time control data in the region units from the control unit and successively and sequentially uses the inputted exposure time control data to carry out the image acquisition based on the exposure time control in the pixel region units.

(2) An image pickup apparatus according to (1), wherein the control unit successively and sequentially generates the exposure time control data in the region units based on luminance information in units of at least one line of the preceding picked-up image and outputs the exposure time control data to the image sensor, and the image sensor inputs the exposure time control data in region units from the control unit and successively and sequentially uses the inputted exposure time control data to carry out the image acquisition based on the exposure time control in units of at least one line.

(3) An image pickup apparatus according to (1) or (2), wherein the control unit generates the exposure time control data by calculation that refers to only one block as a pixel region that is a unit for acquiring luminance information of the preceding picked-up image, and outputs the exposure time control data to the image sensor, and the image sensor carries out the image acquisition based on the exposure time control that uses the exposure time control data.

(4) An image pickup apparatus according to any of (1) to (3), wherein the control unit generates first exposure time control data calculated by referring to only one block as a pixel region that is a unit for acquiring luminance information of the preceding picked-up image and second exposure time control data calculated by referring to a plurality of blocks and outputs the first exposure time control data and the second exposure time control data to the image sensor, and the image sensor carries out the image acquisition based on the exposure time control that selectively uses one of the first exposure time control data and the second exposure time control data.

(5) An image pickup apparatus according to (4), wherein the image sensor is operable, when carrying out the image acquisition selectively using the first exposure time control data and the second exposure time control data, to carry out a reset process of accumulated pixel charge to set a selectively used exposure time.

(6) An image pickup apparatus according to any of (1) to (5), wherein the control unit successively and sequentially generates the exposure time control data in the region units based on luminance information in pixel region units that form part of an image frame N that is the preceding picked-up image and outputs the exposure time control data to the image sensor, and the image sensor inputs the exposure time control data in the region units from the control unit and successively and sequentially uses the inputted exposure time control data to carry out exposure time control in the pixel region units of an image frame N+1 that is a consecutively picked-up image following the image frame N.

(7) An image pickup apparatus according to any of (1) to (6), further including:

a high dynamic range processing unit generating a high dynamic range image based on pixel information of long exposure pixels and short exposure pixels.

Furthermore, a method of processing executed by the apparatus described above and the like, and programs for executing the processing are also included in the configuration of the present disclosure.

Also, a series of processes described in the specification can be performed by hardware, software, or a combination of both. In the case of performing software-based processing, a program storing a processing sequence can be installed in a memory in a computer embedded in dedicated hardware and be executed, or the program can be installed in a general-purpose computer capable of performing various processes and be executed. For example, the program can be stored in advance in a recording medium. Besides installing the program in a computer from the recording medium, the program can be received over a network such as a LAN (Local Area Network) or the Internet and be installed in a recording medium such as an embedded hard disk or the like.

Additionally, various processes described in the specification may be performed, not only chronologically according to the description, but also in parallel or individually according to the processing capability of an apparatus performing the process or as appropriate. Moreover, the system in the present specification is a logical group of a plurality of apparatuses, and the apparatuses of respective configurations are not necessarily in one housing.

As described above, according to the embodiments of the present disclosure, an exposure time control process with a reduced delay is realized in a configuration that controls the exposure time for each pixel region of an image.

More specifically, in the above configuration, a control unit generating exposure time control data in which exposure time of an image sensor is set in pixel region units and an image sensor inputting the exposure time control data and carrying out image acquisition based on exposure time control in the pixel region units are included. The control unit successively and sequentially generates the exposure time control data in region units based on luminance information in the pixel region units that form part of a preceding picked-up image and outputs the exposure time control data to the image sensor. The image sensor inputs the exposure time control data in the region units from the control unit and successively and sequentially uses the inputted exposure time control data to carry out the image acquisition based on the exposure time control in the pixel region units.

By carrying out processing that successively applies the exposure time control information in region units, exposure time control processing with a reduced delay is realized.

The present disclosure contains subject matter related to that disclosed in Japanese Priority Patent Application JP 2011-131116 filed in the Japan Patent Office on Jun. 13, 2011, the entire content of which is hereby incorporated by reference.

What is claimed is:

1. An image pickup apparatus comprising:
one or more processors configured to:
generate region-specific exposure time control data in which an exposure time of an image sensor is individually set in respective pixel region units of a plurality of pixel region units, wherein the exposure time of the image sensor is set in the respective pixel region units independent of information of the plurality of pixel region units;
input the region-specific exposure time control data and carry out image acquisition based on exposure time control in the respective pixel region units of the plurality of pixel region units;
successively and sequentially generate the region-specific exposure time control data in individual region units; and
input the region-specific exposure time control data in the individual region units and successively and sequentially use the inputted region-specific exposure time control data to carry out the image acquisition based on the exposure time control in the respective pixel region units of the plurality of pixel region units.

2. The image pickup apparatus according to claim 1, wherein the one or more processors are configured to:
successively and sequentially generate the region-specific exposure time control data in the individual region units based on luminance information in units of at least one line of a preceding picked-up image and output the region-specific exposure time control data to the image sensor, and
input the region-specific exposure time control data in the individual region units and successively and sequentially use the inputted region-specific exposure time control data to carry out the image acquisition based on the exposure time control in units of at least one line.

3. The image pickup apparatus according to claim 1, wherein the one or more processors are configured to:
generate the region-specific exposure time control data by a calculation that refers to only one block as a pixel region that is a unit for acquiring luminance information of a preceding picked-up image, and output the region-specific exposure time control data to the image sensor, and carry out the image acquisition based on the exposure time control that uses the region-specific exposure time control data.

4. The image pickup apparatus according to claim 1, wherein the control unit is configured to generate first region-specific exposure time control data calculated by referring to only one block as a pixel region that is a unit for acquiring luminance information of the preceding picked-up image and second region-specific exposure time control data calculated by referring to a plurality of blocks and output the first region-specific exposure time control data and the second region-specific exposure time control data to the image sensor, and the image sensor is configured to carry out the image acquisition based on the exposure time control that selectively uses one of the first region-specific exposure time control data and the second region-specific exposure time control data.

5. The image pickup apparatus according to claim 4, wherein the image sensor is configured, when carrying out the image acquisition selectively using the first region-specific exposure time control data and the second region-specific exposure time control data, to carry out a reset process of accumulated pixel charge to set a selectively used exposure time.

6. The image pickup apparatus according to claim 1, wherein the one or more processors are configured to:
successively and sequentially generate the region-specific exposure time control data in the individual region units based on luminance information in pixel region units that form part of an image frame N that is a preceding picked-up image and output the region-specific exposure time control data to the image sensor, and
input the region-specific exposure time control data in the individual region units and successively and sequentially use the inputted region-specific exposure time control data to carry out exposure time control in respective pixel region units of the plurality of pixel region units of an image frame N+1 that is a consecutively picked-up image following the image frame N.

7. The Image pickup apparatus according to claim 1, wherein the one or more processors are configured to:
generate a high dynamic range image based on pixel information of long exposure pixels and short exposure pixels.

8. An image pickup apparatus control method executed by an image pickup apparatus, the method comprising:
generating region-specific exposure time control data in which an exposure time of an image sensor is individually set in respective pixel region units of a plurality of pixel region units, wherein the exposure time of the image sensor is set in the respective pixel region units independent of information of the plurality of pixel region units; and
inputting the region-specific exposure time control data and carrying out image acquisition based on exposure time control in the respective pixel region units of the plurality of pixel region units,
wherein generating comprises, the region-specific exposure time control data being successively and sequentially generated in individual region units, and
inputting comprises the region-specific exposure time control data in the individual region units and the inputted region-specific exposure time control data is successively and sequentially used to carry out the image acquisition based on the exposure time control in the respective pixel region units of the plurality of pixel region units.

9. A non-transitory computer-readable storage medium having stored thereon instructions that, when executed by a processor, perform a method of controlling an image pickup apparatus, the method comprising:
generating region-specific exposure time control data in which an exposure time of an image sensor is individually set in respective pixel region units of a plurality of pixel region units, wherein the exposure time of the image sensor is set in the respective pixel region units independent of information of the plurality of pixel region units; and
inputting the region-specific exposure time control data and carrying out image acquisition based on exposure time control in the respective pixel region units of the plurality of pixel region units,
wherein generating comprises, the region-specific exposure time control data being successively and sequentially generated in individual region units, and
inputting comprises the region-specific exposure time control data in the individual region units and the inputted region-specific exposure time control data is successively and sequentially used to carry out the image acquisition based on the exposure time control in the respective pixel region units of the plurality of pixel region units.

* * * * *